United States Patent
Lee

(10) Patent No.: US 10,814,807 B2
(45) Date of Patent: Oct. 27, 2020

(54) WIRELESS CHARGER FOR MOBILE TERMINAL IN VEHICLE, AND VEHICLE

(71) Applicant: LG ELECTRONICS INC., Seoul (KR)

(72) Inventor: Younghak Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 184 days.

(21) Appl. No.: 15/861,505

(22) Filed: Jan. 3, 2018

(65) Prior Publication Data

US 2018/0198313 A1 Jul. 12, 2018

Related U.S. Application Data

(60) Provisional application No. 62/442,048, filed on Jan. 4, 2017.

(30) Foreign Application Priority Data

Mar. 30, 2017 (KR) .................. 10-2017-0041043

(51) Int. Cl.
| | | |
|---|---|---|
| *H02J 50/80* | (2016.01) | |
| *H02J 50/60* | (2016.01) | |
| *B60R 16/03* | (2006.01) | |
| *H04W 8/00* | (2009.01) | |
| *H02J 50/12* | (2016.01) | |
| *H04B 1/3883* | (2015.01) | |
| *H02J 7/00* | (2006.01) | |

(52) U.S. Cl.
CPC ............. *B60R 16/03* (2013.01); *H02J 50/12* (2016.02); *H02J 50/60* (2016.02); *H02J 50/80* (2016.02); *H04W 8/005* (2013.01); *H02J 7/00034* (2020.01); *H04B 1/3883* (2013.01)

(58) Field of Classification Search
CPC .......... H02J 7/025; H02J 7/0003; H02J 50/12; H02J 7/04; H02J 50/60; H02J 50/80; H04B 5/0037; H04W 8/005; B60R 16/03
USPC .......................................... 320/108; 307/104
See application file for complete search history.

(56) References Cited

U.S. PATENT DOCUMENTS

| | | | | |
|---|---|---|---|---|
| 6,212,430 B1 * | 4/2001 | Kung | .................... | A61N 1/3787 607/61 |
| 6,361,396 B1 * | 3/2002 | Snyder | ..................... | A63H 3/28 446/297 |
| 6,366,817 B1 * | 4/2002 | Kung | .................... | A61N 1/3787 607/61 |
| 6,400,991 B1 * | 6/2002 | Kung | .................... | A61N 1/3787 607/61 |
| 7,262,700 B2 * | 8/2007 | Hsu | ......................... | H02J 5/005 340/572.1 |
| 7,355,150 B2 * | 4/2008 | Baarman | ................ | H05B 6/062 219/620 |

(Continued)

FOREIGN PATENT DOCUMENTS

EP 2808972 A1 12/2014
WO WO 2007/107888 A2 9/2007

*Primary Examiner* — John T Trischler
(74) *Attorney, Agent, or Firm* — Birch, Stewart, Kolasch & Birch, LLP

(57) ABSTRACT

A wireless charger for a mobile terminal in a vehicle includes a power transmitter configured to wirelessly transmit power to a first mobile terminal and a processor configured to acquire model information of the first mobile terminal and to adjust parameters of the power based on the model information.

10 Claims, 21 Drawing Sheets

(56) References Cited

U.S. PATENT DOCUMENTS

| | | | | |
|---|---|---|---|---|
| 7,612,528 B2 * | | 11/2009 | Baarman | H01F 5/02 320/108 |
| 7,948,208 B2 * | | 5/2011 | Partovi | H02J 7/0027 320/108 |
| 7,952,322 B2 * | | 5/2011 | Partovi | H01F 5/003 320/108 |
| 7,989,986 B2 * | | 8/2011 | Baarman | H02J 7/025 307/104 |
| 8,069,100 B2 * | | 11/2011 | Taylor | G06Q 20/10 705/34 |
| 8,097,984 B2 * | | 1/2012 | Baarman | H02J 7/025 307/104 |
| 8,169,185 B2 * | | 5/2012 | Partovi | H01F 5/003 320/108 |
| 8,212,518 B2 * | | 7/2012 | Pijnenburg | H02J 7/022 320/108 |
| 8,234,189 B2 * | | 7/2012 | Taylor | G06Q 20/10 705/34 |
| 8,373,386 B2 * | | 2/2013 | Baarman | H02J 5/005 320/108 |
| 8,502,497 B2 * | | 8/2013 | Pijnenburg | H02J 7/022 320/108 |
| 8,587,154 B2 * | | 11/2013 | Fells | H01F 38/14 307/104 |
| 8,618,770 B2 * | | 12/2013 | Baarman | H02J 7/025 320/108 |
| 8,629,652 B2 * | | 1/2014 | Partovi | H02J 7/0027 320/108 |
| 8,629,654 B2 * | | 1/2014 | Partovi | H01F 5/003 320/108 |
| 8,853,890 B2 * | | 10/2014 | Suzuki | H04B 5/0037 307/104 |
| 8,890,470 B2 * | | 11/2014 | Partovi | H01F 7/0252 320/108 |
| 8,896,264 B2 * | | 11/2014 | Partovi | H01F 7/0252 320/108 |
| 8,901,881 B2 * | | 12/2014 | Partovi | H01F 7/0252 320/108 |
| 8,947,047 B2 * | | 2/2015 | Partovi | H01F 5/003 320/108 |
| 9,065,157 B2 * | | 6/2015 | Van Wiemeersch | H01M 10/44 |
| 9,093,857 B2 * | | 7/2015 | Sakai | H02J 7/0027 |
| 9,124,123 B2 * | | 9/2015 | Jung | H02J 7/0013 |
| 9,124,124 B2 * | | 9/2015 | Van Wiemeersch | H02J 17/00 |
| 9,130,397 B2 * | | 9/2015 | Leabman | H04B 1/04 |
| 9,155,047 B2 * | | 10/2015 | You | H04W 52/0267 |
| 9,172,434 B2 * | | 10/2015 | Kwon | H04B 5/0081 |
| 9,184,598 B2 * | | 11/2015 | Colja | H02J 5/005 |
| 9,190,858 B2 * | | 11/2015 | Baarman | H02J 5/005 |
| 9,276,437 B2 * | | 3/2016 | Partovi | H01F 5/003 |
| 9,300,146 B2 * | | 3/2016 | Suzuki | H04B 5/0037 |
| 9,312,728 B2 * | | 4/2016 | Baarman | H02J 7/025 |
| 9,318,912 B2 * | | 4/2016 | Baarman | H02J 7/025 |
| 9,318,913 B2 * | | 4/2016 | Pijnenburg | H02J 7/022 |
| 9,318,946 B2 * | | 4/2016 | Feng | H02M 1/36 |
| 9,344,155 B2 * | | 5/2016 | Moes | H02J 7/025 |
| 9,350,202 B2 * | | 5/2016 | Baarman | H02J 7/025 |
| 9,397,505 B2 * | | 7/2016 | Lee | H02J 5/005 |
| 9,413,175 B2 * | | 8/2016 | Park | H02J 5/005 |
| 9,455,595 B2 * | | 9/2016 | Jeon | H02J 7/0044 |
| 9,461,479 B2 * | | 10/2016 | Chae | H02J 7/025 |
| 9,461,501 B2 * | | 10/2016 | Partovi | H02J 7/0027 |
| 9,484,751 B2 * | | 11/2016 | Byrne | H02J 5/005 |
| 9,502,925 B2 * | | 11/2016 | Kim | H02J 17/00 |
| 9,553,479 B2 * | | 1/2017 | Lee | H02J 7/025 |
| 9,559,553 B2 * | | 1/2017 | Bae | H02J 50/12 |
| 9,577,440 B2 * | | 2/2017 | Partovi | H01F 5/003 |
| 9,595,834 B2 * | | 3/2017 | Yamamoto | G01V 3/10 |
| 9,601,943 B2 * | | 3/2017 | Partovi | H01F 5/003 |
| 9,698,632 B2 * | | 7/2017 | Davison | H02J 7/0044 |
| 9,711,993 B2 * | | 7/2017 | Kim | H02J 5/005 |
| 9,735,610 B2 * | | 8/2017 | Colja | H02J 5/005 |
| 9,742,216 B2 * | | 8/2017 | Hur | H02J 7/04 |
| 9,766,656 B2 * | | 9/2017 | Hur | G06F 1/1632 |
| 9,793,721 B2 * | | 10/2017 | Partovi | H01F 5/003 |
| 9,800,079 B2 * | | 10/2017 | Wippler | H02J 7/025 |
| 9,805,863 B2 * | | 10/2017 | Hansen | H01F 38/14 |
| 9,837,829 B2 * | | 12/2017 | Park | H02J 7/025 |
| 9,876,379 B1 * | | 1/2018 | Leabman | H02J 7/025 |
| 9,893,555 B1 * | | 2/2018 | Leabman | H02J 7/025 |
| 9,906,275 B2 * | | 2/2018 | Leabman | H04B 5/0037 |
| 9,912,380 B2 * | | 3/2018 | Suzuki | H04B 5/0037 |
| 9,935,488 B2 * | | 4/2018 | Yamanishi | H02J 50/12 |
| 9,948,112 B2 * | | 4/2018 | Hao | H01F 38/14 |
| 9,948,135 B2 * | | 4/2018 | Leabman | H02J 7/042 |
| 9,948,358 B2 * | | 4/2018 | Fells | H01F 38/14 |
| 9,954,397 B2 * | | 4/2018 | Bunsen | H02J 7/025 |
| 9,980,321 B2 * | | 5/2018 | Sorenson | A47J 37/0611 |
| 9,997,836 B2 * | | 6/2018 | Kwon | H01Q 9/0407 |
| 10,008,875 B1 * | | 6/2018 | Leabman | H02J 7/025 |
| 10,020,678 B1 * | | 7/2018 | Leabman | H02J 50/40 |
| 10,027,168 B2 * | | 7/2018 | Leabman | H02J 17/00 |
| 10,033,222 B1 * | | 7/2018 | Leabman | H02J 50/40 |
| 10,038,337 B1 * | | 7/2018 | Leabman | H02J 17/00 |
| 10,044,229 B2 * | | 8/2018 | Partovi | H01F 5/003 |
| 10,050,470 B1 * | | 8/2018 | Leabman | H02J 5/005 |
| 10,069,328 B2 * | | 9/2018 | Meng | H02J 7/025 |
| 10,069,345 B2 * | | 9/2018 | Lee | H02J 50/12 |
| 10,084,328 B2 * | | 9/2018 | You | H01F 7/0252 |
| 10,103,785 B2 * | | 10/2018 | Kim | H02J 5/005 |
| 10,124,754 B1 * | | 11/2018 | Leabman | B60R 16/03 |
| 10,128,686 B1 * | | 11/2018 | Leabman | H02J 17/00 |
| 10,129,935 B2 * | | 11/2018 | Yaman | A47J 27/004 |
| 10,135,294 B1 * | | 11/2018 | Leabman | H02J 50/27 |
| 10,135,295 B2 * | | 11/2018 | Leabman | H02J 17/00 |
| 10,153,660 B2 * | | 12/2018 | Leabman | H02J 50/80 |
| 10,158,259 B1 * | | 12/2018 | Leabman | H04B 5/0037 |
| 10,164,467 B2 * | | 12/2018 | Baarman | H02J 7/025 |
| 10,182,472 B2 * | | 1/2019 | Yaman | H05B 6/1236 |
| 10,193,400 B2 * | | 1/2019 | Long | H02J 50/90 |
| 10,198,892 B2 * | | 2/2019 | Taylor | G06Q 20/10 |
| 10,199,850 B2 * | | 2/2019 | Leabman | H02J 7/025 |
| 10,218,208 B2 * | | 2/2019 | Park | H02J 5/005 |
| 10,277,062 B2 * | | 4/2019 | Govindaraj | H02J 7/042 |
| 10,277,070 B2 * | | 4/2019 | Baarman | H02J 7/025 |
| 10,284,016 B2 * | | 5/2019 | Park | H02J 50/12 |
| 10,284,022 B2 * | | 5/2019 | Kim | H02J 17/00 |
| 10,291,036 B2 * | | 5/2019 | Muratov | H02J 50/12 |
| 10,291,059 B2 * | | 5/2019 | Davison | H02J 7/0044 |
| 10,297,380 B2 * | | 5/2019 | Kim | H01F 38/14 |
| 10,305,329 B2 * | | 5/2019 | Baarman | H02J 7/025 |
| 10,312,715 B2 * | | 6/2019 | Leabman | H02J 7/025 |
| 10,312,732 B2 * | | 6/2019 | Baarman | H05B 6/062 |
| 10,320,234 B2 * | | 6/2019 | Aioanei | H02J 7/025 |
| 10,326,315 B2 * | | 6/2019 | Bae | H02J 7/00 |
| 10,327,119 B2 * | | 6/2019 | Park | H04W 88/04 |
| 10,355,511 B2 * | | 7/2019 | Hatakeyama | H02J 7/0044 |
| 10,367,368 B2 * | | 7/2019 | Yuk | H02J 7/025 |
| 10,381,879 B2 * | | 8/2019 | Park | H02J 7/02 |
| 10,411,525 B2 * | | 9/2019 | Weidner | H02J 50/12 |
| 2005/0007067 A1 * | | 1/2005 | Baarman | H01F 5/02 320/108 |
| 2006/0202665 A1 * | | 9/2006 | Hsu | H02J 5/005 320/139 |
| 2007/0182367 A1 * | | 8/2007 | Partovi | H01F 5/003 320/108 |
| 2007/0221668 A1 * | | 9/2007 | Baarman | H05B 6/062 219/746 |
| 2007/0279002 A1 * | | 12/2007 | Partovi | H02J 7/0027 320/115 |
| 2008/0157603 A1 * | | 7/2008 | Baarman | H02J 50/90 307/104 |
| 2008/0217999 A1 * | | 9/2008 | Baarman | H05B 6/062 307/104 |
| 2009/0096413 A1 * | | 4/2009 | Partovi | H01F 5/003 320/108 |
| 2010/0171461 A1 * | | 7/2010 | Baarman | H02J 5/005 320/108 |
| 2010/0207575 A1 * | | 8/2010 | Pijnenburg | H02J 7/022 320/108 |

(56) References Cited

U.S. PATENT DOCUMENTS

| | | | |
|---|---|---|---|
| 2011/0043163 A1* | 2/2011 | Baarman | H02J 7/025 320/108 |
| 2011/0043327 A1* | 2/2011 | Baarman | H02J 7/025 340/5.8 |
| 2011/0221385 A1* | 9/2011 | Partovi | H01F 5/003 320/101 |
| 2011/0248674 A1* | 10/2011 | Baarman | H02J 7/025 320/108 |
| 2011/0316348 A1* | 12/2011 | Kai | H02J 50/40 307/104 |
| 2012/0007437 A1* | 1/2012 | Fells | H01F 38/14 307/104 |
| 2012/0009869 A1* | 1/2012 | Suzuki | H04B 5/0037 455/41.1 |
| 2012/0032524 A1* | 2/2012 | Baarman | H05B 6/062 307/104 |
| 2012/0038317 A1* | 2/2012 | Miyamoto | H02J 7/025 320/108 |
| 2012/0049642 A1* | 3/2012 | Kim | H02J 5/005 307/104 |
| 2012/0098348 A1* | 4/2012 | Inoue | B60L 53/12 307/104 |
| 2012/0104868 A1* | 5/2012 | Baarman | H02J 7/025 307/104 |
| 2012/0126745 A1* | 5/2012 | Partovi | H02J 7/0027 320/108 |
| 2012/0146576 A1* | 6/2012 | Partovi | H01F 7/0252 320/108 |
| 2012/0235636 A1* | 9/2012 | Partovi | H02J 7/025 320/108 |
| 2012/0235638 A1* | 9/2012 | Pijnenburg | H02J 7/022 320/108 |
| 2012/0256585 A1* | 10/2012 | Partovi | H01F 5/003 320/108 |
| 2012/0259735 A1* | 10/2012 | Taylor | G06Q 20/10 705/26.41 |
| 2012/0280575 A1* | 11/2012 | Kim | H02J 17/00 307/104 |
| 2012/0328043 A1* | 12/2012 | Kwon | H04B 5/0081 375/295 |
| 2013/0080091 A1* | 3/2013 | Kwon | G06K 19/0712 702/60 |
| 2013/0082652 A1* | 4/2013 | Jung | H02J 7/0013 320/108 |
| 2013/0093389 A1* | 4/2013 | Partovi | H01F 7/0252 320/108 |
| 2013/0093390 A1* | 4/2013 | Partovi | H02J 7/025 320/108 |
| 2013/0099563 A1* | 4/2013 | Partovi | H01F 5/003 307/10.1 |
| 2013/0099735 A1* | 4/2013 | Partovi | H01F 7/0252 320/108 |
| 2013/0106364 A1* | 5/2013 | Baarman | H02J 5/005 320/137 |
| 2013/0110318 A1* | 5/2013 | Colja | H02J 5/005 701/2 |
| 2013/0119927 A1* | 5/2013 | Partovi | H02J 7/025 320/108 |
| 2013/0119929 A1* | 5/2013 | Partovi | H02J 7/025 320/108 |
| 2013/0154554 A1* | 6/2013 | Sakai | H02J 7/0027 320/108 |
| 2013/0175983 A1* | 7/2013 | Partovi | H01F 5/003 320/108 |
| 2013/0249479 A1* | 9/2013 | Partovi | H02J 7/025 320/108 |
| 2013/0271069 A1* | 10/2013 | Partovi | H02J 7/025 320/108 |
| 2013/0285604 A1* | 10/2013 | Partovi | H02J 7/0042 320/108 |
| 2013/0285605 A1* | 10/2013 | Partovi | H02J 7/0042 320/108 |
| 2013/0293190 A1* | 11/2013 | Pijnenburg | H02J 7/022 320/108 |
| 2013/0310112 A1* | 11/2013 | You | H04W 52/0267 455/566 |
| 2014/0028111 A1* | 1/2014 | Hansen | H01F 38/14 307/104 |
| 2014/0042824 A1* | 2/2014 | Fells | H01F 38/14 307/104 |
| 2014/0103865 A1* | 4/2014 | Van Wiemeersch | H02J 17/00 320/108 |
| 2014/0103867 A1* | 4/2014 | Baarman | H02J 7/025 320/108 |
| 2014/0103873 A1* | 4/2014 | Partovi | H02J 7/0027 320/108 |
| 2014/0125277 A1* | 5/2014 | Van Wiemeersch | H01M 10/44 320/108 |
| 2014/0132210 A1* | 5/2014 | Partovi | H02J 5/005 320/108 |
| 2014/0300196 A1* | 10/2014 | Bunsen | H02J 50/10 307/104 |
| 2014/0306654 A1* | 10/2014 | Partovi | H02J 7/025 320/108 |
| 2014/0347008 A1* | 11/2014 | Chae | H02J 7/025 320/108 |
| 2014/0349573 A1* | 11/2014 | Moes | H02J 7/025 455/41.1 |
| 2014/0354222 A1* | 12/2014 | Park | H02J 5/005 320/108 |
| 2014/0354223 A1* | 12/2014 | Lee | H02J 5/005 320/108 |
| 2014/0368055 A1* | 12/2014 | Suzuki | H04B 5/0037 307/104 |
| 2015/0035372 A1* | 2/2015 | Aioanei | H02J 7/025 307/104 |
| 2015/0123491 A1* | 5/2015 | Kim | H02J 5/005 307/104 |
| 2015/0130412 A1* | 5/2015 | Partovi | H01F 7/0252 320/108 |
| 2015/0145475 A1* | 5/2015 | Partovi | H01F 5/003 320/108 |
| 2015/0171659 A1* | 6/2015 | Lee | H02J 7/025 320/108 |
| 2015/0280450 A1* | 10/2015 | Park | H02J 7/025 307/104 |
| 2015/0288067 A1* | 10/2015 | Kwon | H01Q 9/0407 320/108 |
| 2015/0326061 A1* | 11/2015 | Davison | H02J 7/0044 320/108 |
| 2015/0349541 A1* | 12/2015 | Yamamoto | G01V 3/10 307/104 |
| 2015/0357860 A1* | 12/2015 | Wippler | H02J 7/025 320/108 |
| 2015/0380978 A1* | 12/2015 | Toivola | H02J 7/04 320/108 |
| 2016/0013679 A1* | 1/2016 | Jeon | H02J 7/0044 320/108 |
| 2016/0049828 A1* | 2/2016 | Colja | H02J 5/005 320/108 |
| 2016/0056661 A1* | 2/2016 | Tanaka | H02J 5/005 320/108 |
| 2016/0062404 A1* | 3/2016 | Hur | G06F 1/1632 361/679.26 |
| 2016/0064997 A1* | 3/2016 | Hur | H02J 7/04 320/108 |
| 2016/0079774 A1* | 3/2016 | Baarman | H05B 6/062 307/104 |
| 2016/0149434 A1* | 5/2016 | Kim | H02J 5/005 320/108 |
| 2016/0181860 A1* | 6/2016 | Partovi | H01F 5/003 320/108 |
| 2016/0181875 A1* | 6/2016 | Long | H02J 50/90 320/108 |
| 2016/0182126 A1* | 6/2016 | Suzuki | H04B 5/0037 455/41.1 |

(56) References Cited

U.S. PATENT DOCUMENTS

| | | | |
|---|---|---|---|
| 2016/0190873 A1* | 6/2016 | Baarman | H02J 7/025 307/104 |
| 2016/0225024 A1* | 8/2016 | Baarman | H02J 7/025 |
| 2016/0241046 A1* | 8/2016 | Lee | H02J 50/90 |
| 2016/0241087 A1* | 8/2016 | Bae | H02J 50/12 |
| 2016/0268843 A1* | 9/2016 | Baarman | H02J 7/025 |
| 2016/0359370 A1* | 12/2016 | Park | H02J 50/12 |
| 2016/0359375 A1* | 12/2016 | Lee | H02J 50/12 |
| 2017/0018937 A1* | 1/2017 | Muratov | H02J 50/12 |
| 2017/0018951 A1* | 1/2017 | Park | H02J 5/005 |
| 2017/0025896 A1* | 1/2017 | Partovi | H02J 7/0027 |
| 2017/0033591 A1* | 2/2017 | Govindaraj | H02J 7/042 |
| 2017/0070103 A1* | 3/2017 | Kim | H02J 17/00 |
| 2017/0077735 A1* | 3/2017 | Leabman | H02J 7/025 |
| 2017/0077736 A1* | 3/2017 | Leabman | H02J 7/025 |
| 2017/0077995 A1* | 3/2017 | Leabman | H04B 5/0037 |
| 2017/0085112 A1* | 3/2017 | Leabman | H02J 7/025 |
| 2017/0085120 A1* | 3/2017 | Leabman | H02J 7/042 |
| 2017/0085126 A1* | 3/2017 | Leabman | H02J 17/00 |
| 2017/0085127 A1* | 3/2017 | Leabman | H02J 17/00 |
| 2017/0098967 A1* | 4/2017 | Bae | H02J 50/12 |
| 2017/0103849 A1* | 4/2017 | Leem | H01F 38/14 |
| 2017/0141604 A1* | 5/2017 | Park | H02J 7/025 |
| 2017/0194809 A1* | 7/2017 | Partovi | H01F 5/003 |
| 2017/0201108 A1* | 7/2017 | You | H01F 7/0252 |
| 2017/0250563 A1* | 8/2017 | Davison | H02J 7/0044 |
| 2017/0294797 A1* | 10/2017 | Meng | H02J 7/025 |
| 2017/0294798 A1* | 10/2017 | Yuk | H02J 7/025 |
| 2017/0297438 A1* | 10/2017 | Park | H01F 38/14 |
| 2017/0338696 A1* | 11/2017 | Bae | H02J 7/00 |
| 2017/0365393 A1* | 12/2017 | Kim | H01F 38/14 |
| 2017/0368945 A1* | 12/2017 | Park | H01F 38/14 |
| 2018/0041047 A1* | 2/2018 | Partovi | H01F 5/003 |
| 2018/0083493 A1* | 3/2018 | Hwang | H01Q 1/24 |
| 2018/0138756 A1* | 5/2018 | Bae | H02J 50/12 |
| 2018/0191189 A9* | 7/2018 | Leabman | H02J 7/025 |
| 2018/0192266 A1* | 7/2018 | Park | H04W 88/04 |
| 2018/0205256 A1* | 7/2018 | Kwon | B60R 16/03 |
| 2018/0205257 A1* | 7/2018 | Kwon | H05K 7/20 |
| 2018/0205268 A1* | 7/2018 | Park | H02J 50/12 |
| 2018/0212453 A1* | 7/2018 | Kwon | B60H 1/00 |
| 2018/0212470 A1* | 7/2018 | Leem | H02J 50/12 |
| 2018/0219428 A1* | 8/2018 | Bae | H02J 50/12 |
| 2018/0224909 A1* | 8/2018 | Koo | G06F 1/1632 |
| 2018/0226829 A1* | 8/2018 | Bae | H02J 7/02 |
| 2018/0241223 A1* | 8/2018 | Bae | H02J 50/80 |
| 2018/0287413 A1* | 10/2018 | Jung | H02J 7/00 |
| 2018/0294681 A1* | 10/2018 | Bae | H02J 50/80 |
| 2018/0316388 A1* | 11/2018 | Lee | H04B 5/02 |
| 2018/0351391 A1* | 12/2018 | Park | H02J 7/025 |
| 2018/0351406 A1* | 12/2018 | Lee | H02J 50/80 |
| 2018/0351414 A1* | 12/2018 | Park | H02J 50/40 |
| 2018/0358841 A1* | 12/2018 | Park | H02J 50/12 |
| 2019/0020225 A1* | 1/2019 | Kwon | H02J 50/12 |
| 2019/0027954 A1* | 1/2019 | Lee | H05K 9/00 |
| 2019/0027968 A1* | 1/2019 | Leem | H02J 50/40 |
| 2019/0052116 A1* | 2/2019 | Bae | H02J 50/12 |
| 2019/0058506 A1* | 2/2019 | Lee | H02J 50/12 |
| 2019/0097450 A1* | 3/2019 | Park | H02J 7/02 |
| 2019/0140485 A1* | 5/2019 | Bae | H02J 50/12 |
| 2019/0140699 A1* | 5/2019 | Park | H02J 50/10 |
| 2019/0148971 A1* | 5/2019 | Bae | H02J 7/02 |
| 2019/0148986 A1* | 5/2019 | Yoo | H02J 50/10 307/104 |
| 2019/0165596 A1* | 5/2019 | Park | H02J 5/005 |
| 2019/0173309 A1* | 6/2019 | Jung | H02J 50/12 |
| 2019/0214180 A1* | 7/2019 | Yoon | H01F 10/00 |
| 2019/0214854 A1* | 7/2019 | Leem | H02J 7/02 |
| 2019/0222060 A1* | 7/2019 | Leem | H02J 7/02 |
| 2019/0229765 A1* | 7/2019 | Hwang | H04B 1/3822 |
| 2019/0235041 A1* | 8/2019 | Lee | G01S 1/68 |
| 2019/0237235 A1* | 8/2019 | Kim | H01F 38/14 |
| 2019/0244752 A1* | 8/2019 | Park | H02J 7/02 |
| 2019/0260240 A1* | 8/2019 | Kwon | H02J 50/80 |
| 2020/0021143 A1* | 1/2020 | Gonda | G01V 3/102 |
| 2020/0076244 A1* | 3/2020 | Smith | H01F 27/402 |

* cited by examiner

100

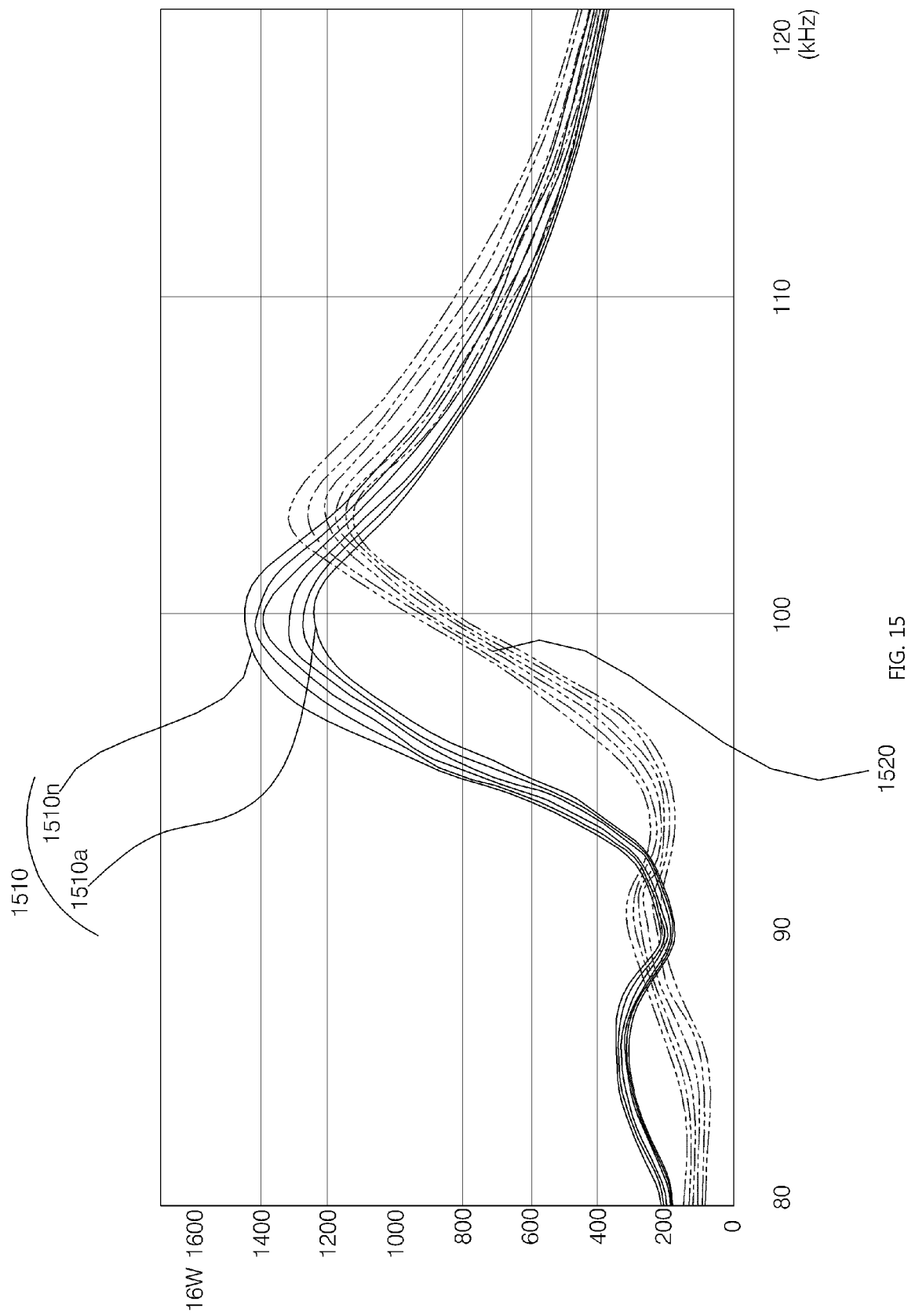

WIRELESS CHARGER FOR MOBILE TERMINAL IN VEHICLE, AND VEHICLE

CROSS-REFERENCE TO RELATED APPLICATION

This application claims the benefit of U.S. Provisional Application No. 62/442,048, filed on Jan. 4, 2017, and claims the benefit of Korean Patent Application No. 10-2017-0041043, filed on Mar. 30, 2017 in the Korean Intellectual Property Office, the disclosures of which are incorporated herein by reference in their entireties.

BACKGROUND OF THE INVENTION

1. Field of the Invention

The present invention relates to a wireless charger for a mobile terminal in a vehicle and a vehicle including the same.

2. Description of the Related Art

Various wireless chargers for mobile terminals are available in the market. However, existing wireless chargers for mobile terminals are made to match only to a specific mobile terminal model and, as such, may not be efficiently used with other mobile terminal models.

In addition, efforts are being made to develop a wireless charger for a mobile terminal in a vehicle.

A wireless charger for a mobile terminal in a vehicle would be used to charge an occupant's mobile terminal; however, each occupant of the vehicle may have different mobile terminal models. In this case, if an existing wireless charger is provided in the vehicle, it is not possible to charge all mobile terminals of different models or, even when possible, a high charging efficiency may not be achieved depending on a model of the mobile terminal to be charged. In addition, if a user attempts to perform wireless charging in the presence of a foreign object, such as a key holder, the wireless charging may not be performed properly and may even result in the risk of fire.

While in a vehicle, a mobile terminal may need to be charged while implementing various functions. In these situations, the charging power should be 5 W or greater. In this case, heat may be generated which is high enough to affect the functions and charging of the mobile terminal. Thus, when it comes to a wireless charger for a mobile terminal in a vehicle, there is also a need for a technology of managing heat generated during wireless charging.

SUMMARY OF THE INVENTION

The present invention has been made in view of the above problems, and it is one object of the present invention to provide a wireless charger for a mobile terminal in a vehicle, in which the wireless charger performs wireless charging in a manner compatible with a model of a mobile terminal.

It is another object of the present invention to provide a wireless charger for a mobile terminal in vehicle in which the wireless charger is capable of detecting a foreign object.

It is yet another object of the present invention to provide a wireless charger for a mobile terminal in a vehicle in which the wireless charger is capable of managing heat that is generated during wireless charging.

It is yet another object of the present invention to provide a vehicle including the wireless charger.

Objects of the present invention should not be limited to the aforementioned objects and other unmentioned objects will be clearly understood by those skilled in the art from the following description.

In accordance with an embodiment of the present invention, the above and other objects can be accomplished by the provision of a wireless charger for a mobile terminal in a vehicle, the wireless charger having a power transmitter configured to wirelessly transmit power to a first mobile terminal and a processor configured to acquire model information of the first mobile terminal and to control the power transmitter to adjust parameters of the power transmitted to the first mobile terminal based on the model information.

In accordance with another embodiment of the present invention, the above and other objects can be accomplished by the provision of a wireless charger for a mobile terminal in a vehicle, the wireless charger having a power transmitter configured to wirelessly transmit power to a first mobile terminal, a memory configured to store frequency response characteristic data for a plurality of mobile terminal models, and a processor configured to acquire model information of the first mobile terminal, acquire frequency characteristic data of power transmitted from the power transmitter, and detect a foreign object by comparing the frequency response characteristic data for the plurality of mobile terminal models and the frequency characteristic data of the power transmitted from the power transmitter.

The details of other embodiments are included in the following description and the accompanying drawings.

The embodiments of the present invention have one or more effects as follows.

First, it is possible to efficiently perform wireless charging of various models of mobile terminals possessed by one or more occupants in a vehicle.

Second, it is possible to efficiently charge a plurality of mobile terminals at the same time.

Third, it is possible to detect a foreign object and, in response to the detection, stop wireless charging or notify a user of the detection, thereby preventing a fire and removing a factor that disturbs the wireless charging.

Fourth, when wireless charging is performed while a mobile terminal implements functions in a vehicle in association with the vehicle, heat generated during the wireless charging is managed so that the wireless charging may not be affected by the heat.

Effects of the present invention should not be limited to the aforementioned effects and other unmentioned effects will be clearly understood by those skilled in the art from the claims.

BRIEF DESCRIPTION OF THE DRAWINGS

The embodiments will be described in detail with reference to the following drawings in which like reference numerals refer to like elements wherein:

FIG. 15 is a diagram illustrating frequency response characteristic data for different models of a mobile terminal according to an embodiment of the present invention;

DETAILED DESCRIPTION OF THE EMBODIMENTS

Figure 1:
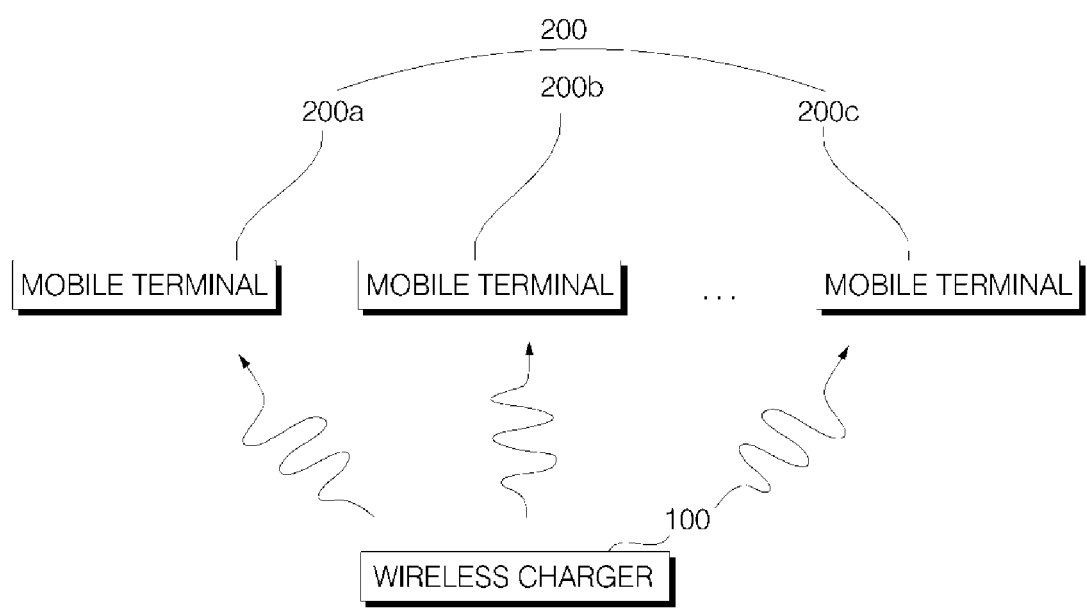
FIG. 1 is a diagram illustrating a wireless charging method of a wireless charger of a mobile terminal in a vehicle according to an embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present invention.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on an automobile.

A vehicle as described in this specification may include an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

FIG. 1 is a diagram illustrating a wireless charging method of a wireless charger of a mobile terminal in a vehicle according to an embodiment of the present invention.

Referring to FIG. 1, a wireless charger 100 for a mobile terminal in a vehicle may use inductive coupling or resonance coupling.

Inductive coupling works on the principle that, when intensity of a current flowing in a primary coil between two adjacent coils is changed, a magnetic field is changed by the change in current and, in turn, a magnetic flux passing through a secondary coil is changed to thereby generate an induced electromotive force on the side of the secondary coil. That is, if two coils are placed close to each other and only a current of the primary coil is changed, an induced electromotive force may be generated even though the two coils are not moved relative to each other.

Resonance coupling works on the principle that, when two coils are at a specific distance, a resonant frequency is applied to a primary coil between the two coils to thereby generate variation of a magnetic field and some of the variation is applied to a secondary coil having the same resonant frequency to thereby generate an induced electromotive force. According to this method, if a transmitter and a receiver resonate at the same frequency, a magnetic wave is transferred through a near magnetic field. If the transmitter and the receiver have different frequencies, energy is not transferred therebetween.

Figure 6:
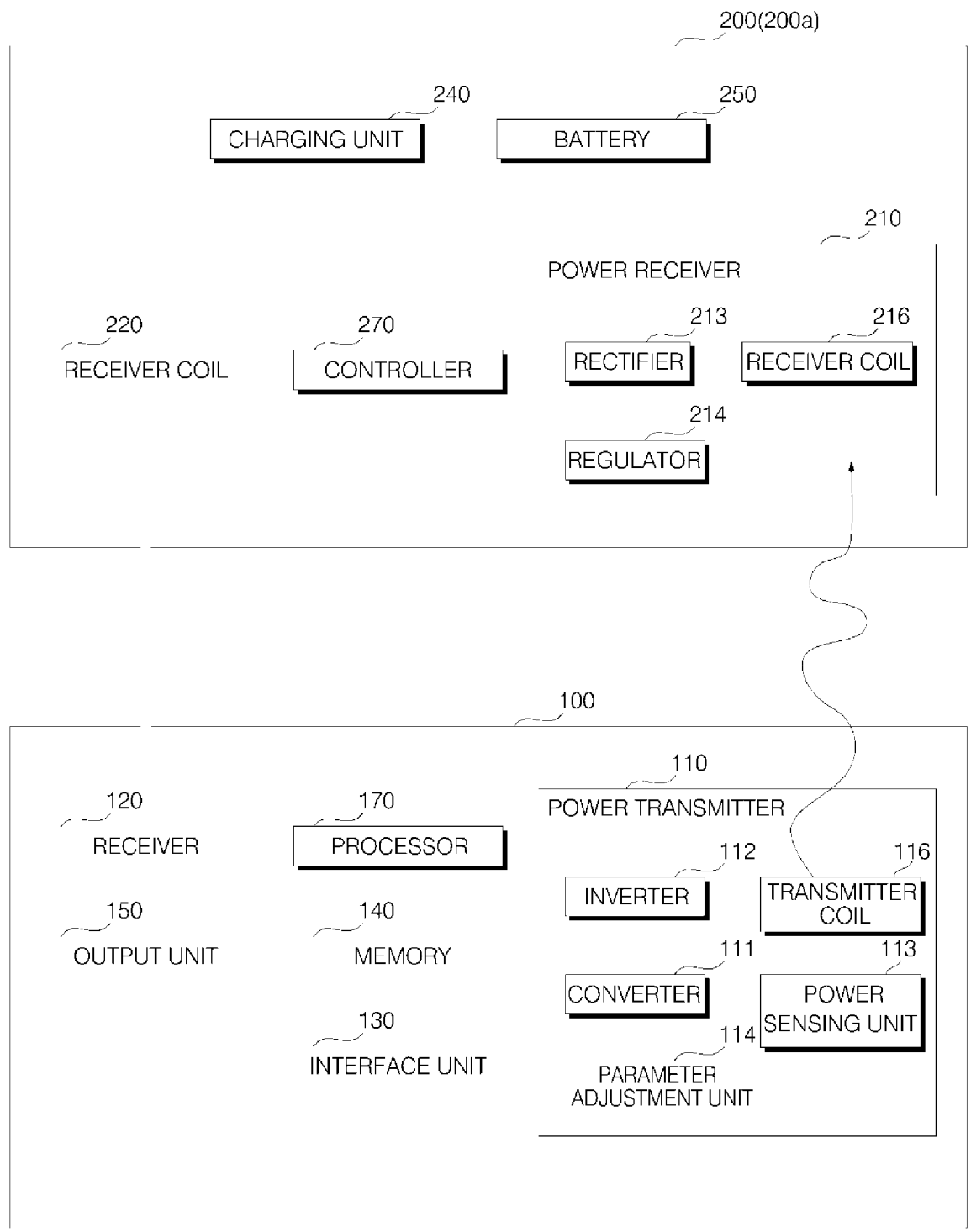
FIG. 6 is a diagram illustrating a wireless charging system according to an embodiment of the present invention.

In both inductive coupling and resonance coupling, a primary coil may be referred to as a transmitter coil 116 (see FIG. 6) and a secondary coil may be referred to as a receiver coil 216 (see FIG. 6).

The wireless charger 100 may wirelessly transmit power to one or more mobile terminals 200. To this end, the wireless charger 100 may include a plurality of transmitter coils 116.

Figure 2:
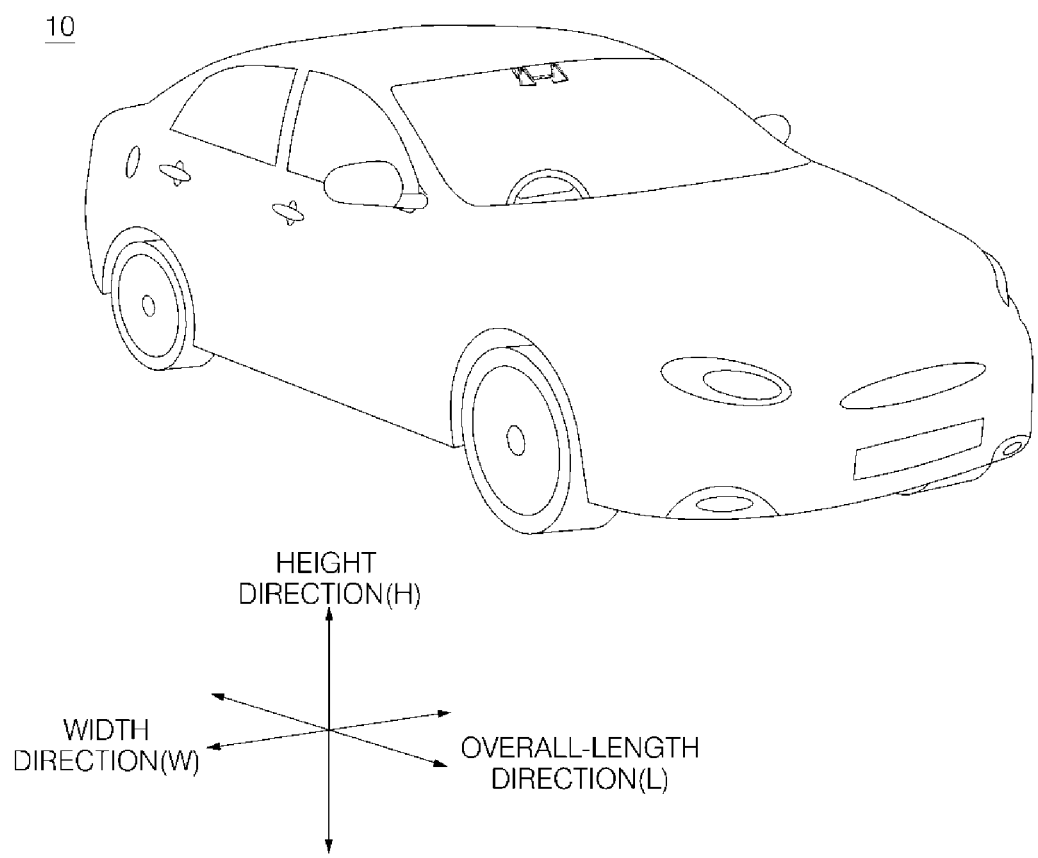
FIG. 2 is a diagram illustrating the exterior appearance of a vehicle according to an embodiment of the present invention.

FIG. 2 is a diagram illustrating the exterior appearance of a vehicle according to an embodiment of the present invention.

Referring to FIG. 2, a vehicle 10 may include wheels, which are rotated by a power source, and a steering input device for adjusting a direction of travel of the vehicle 10. The vehicle 10 may be an autonomous vehicle or may be switchable between an autonomous mode and a manual mode based on a user input.

With reference to the vehicle, the term "overall length" means the length from the front end to the rear end of the vehicle 10, the term "overall width" means the width of the vehicle 10, and the term "overall height" means the height from the bottom of the wheel to the roof. In the following description, the term "overall length direction L" may mean the reference direction for the measurement of the overall length of the vehicle 10, the term "overall width direction W" may mean the reference direction for the measurement of the overall width of the vehicle 10, and the term "overall height direction H" may mean the reference direction for the measurement of the overall height of the vehicle 10.

The vehicle 10 may communicate with the mobile terminal 200 and may perform various functions through communication with the vehicle 10.

The vehicle 10 may include the wireless charger 100. The mobile terminal 200 may be wirelessly charged via the wireless charger 100 while providing various functions through communication with the vehicle 10. In this case, heat may be generated in the wireless charger 100 and the mobile terminal 200. Heat is generated during charging of the mobile terminal 200. For the purpose of safety, the mobile terminal 200 is designed to stop charging when a sensed temperature is equal to or greater than a preset value.

If wireless charging stops due to heat generated by the wireless charging, it takes a long time for full charging and this may cause user inconvenience. In addition, if the mobile terminal 200 is not appropriately charged, it may limit the functionality of the mobile terminal 200. In order to address these issues, the wireless charger 100 manages heat generated by wireless charging, thereby eliminating the inconvenience caused by the long charging time. In addition, the wireless charger 100 may enable the mobile terminal 200 to perform functions even during wireless charging.

Figure 3A:
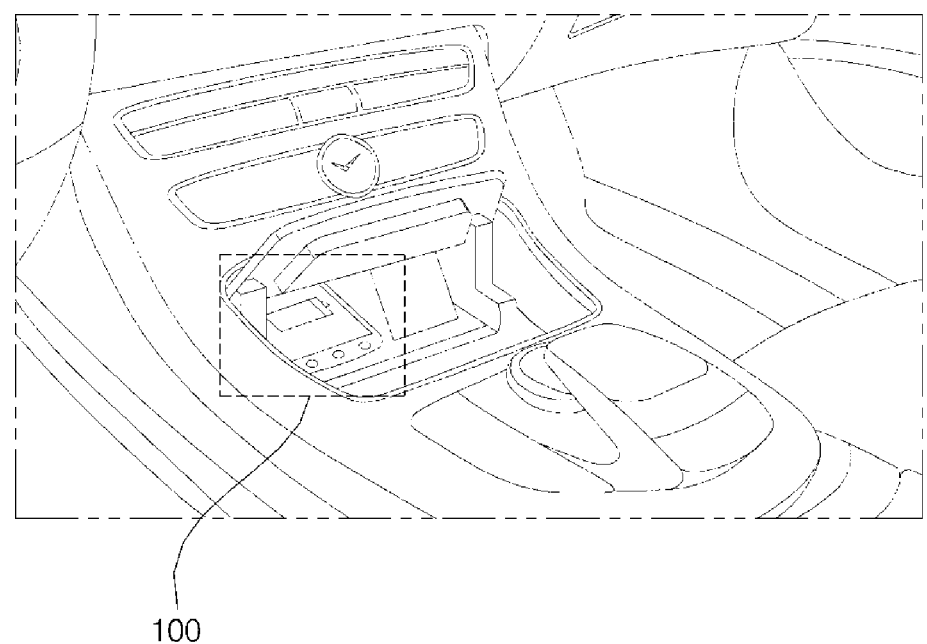
FIGS. 3A and 3B are diagrams illustrating an example of an interior region of a vehicle, the region in which a wireless charger for a mobile terminal in a vehicle according to an embodiment of the present invention is located.
Figure 3B:
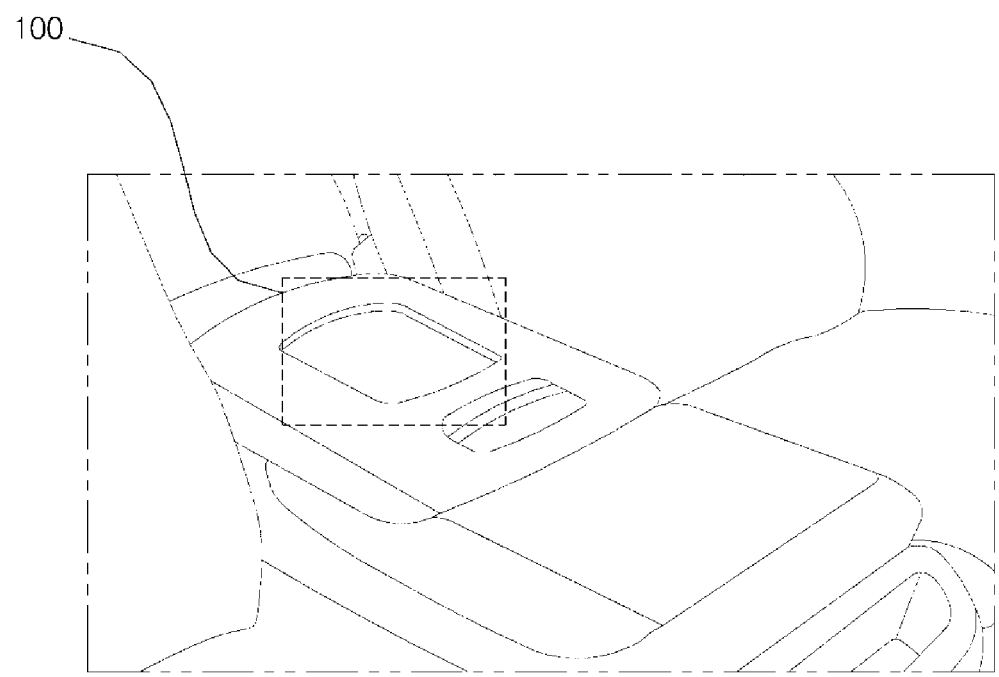

FIGS. 3A and 3B are diagrams illustrating an example of an interior region of a vehicle in which a wireless charger for a mobile terminal in a vehicle according to an embodiment of the present invention is located.

Referring to FIGS. 3A and 3B, the wireless charger 100 may be provided inside the vehicle 10. For example, as shown in FIG. 3A, the wireless charger 100 may be disposed in one region of the center console, one region of the center fascia, one region of the glove box, or one region of the dash board in a front portion of the vehicle. Alternatively, as shown in FIG. 3B, the wireless charger 100 may be disposed in one region of an arm rest of a rear seat.

A pocket may be provided in at least one selected from among the center console, the center fascia, the glove box, the dash board, and the arm rest. The wireless charger 100 may be provided inside the pocket. The pocket may include a cover. The cover may be open and close automatically or manually.

Based on opening and closing of the cover, the wireless charger 100 may determine whether to perform a wireless charging operation. For example, a sensing unit may sense opening/closing of the cover and the presence of the mobile terminal 200 in the pocket. If closing of the cover is sensed while the presence of the mobile terminal 200 in the pocket is sensed, the wireless charger 100 may perform wireless charging. If the presence of the mobile terminal 200 in the pocket is not sensed or opening of the cover is sensed, the wireless charger 100 may not perform wireless charging.

Figure 4:
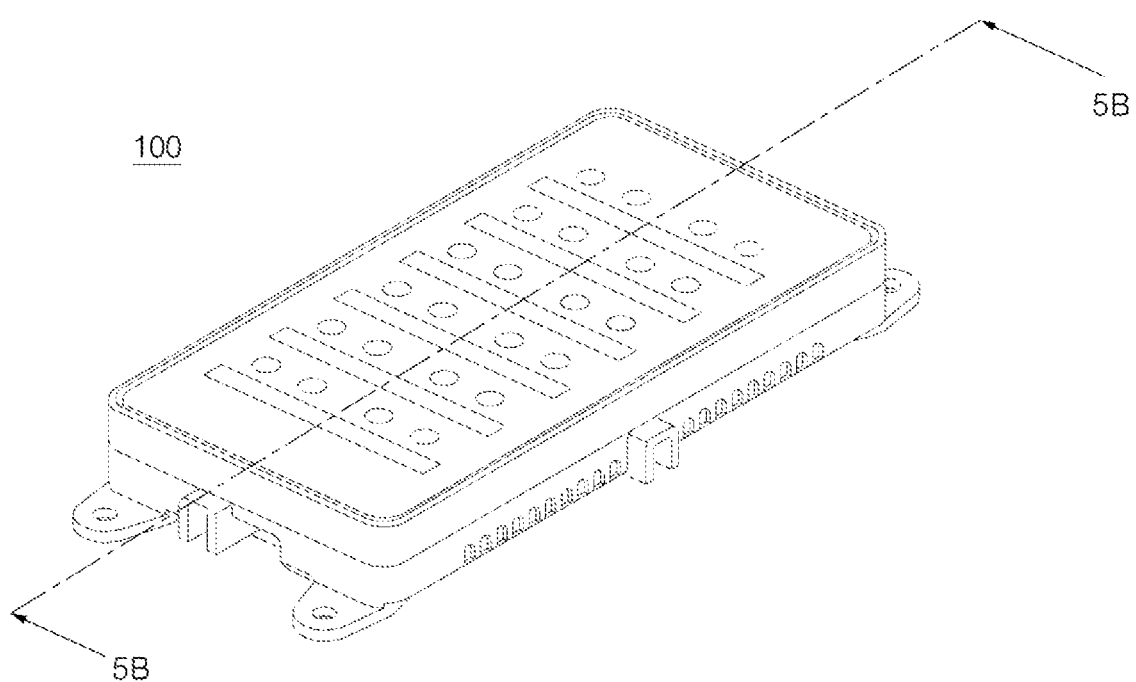
FIG. 4 is a perspective view of a wireless charger for a mobile terminal in a vehicle according to an embodiment of the present invention.
Figure 5A:
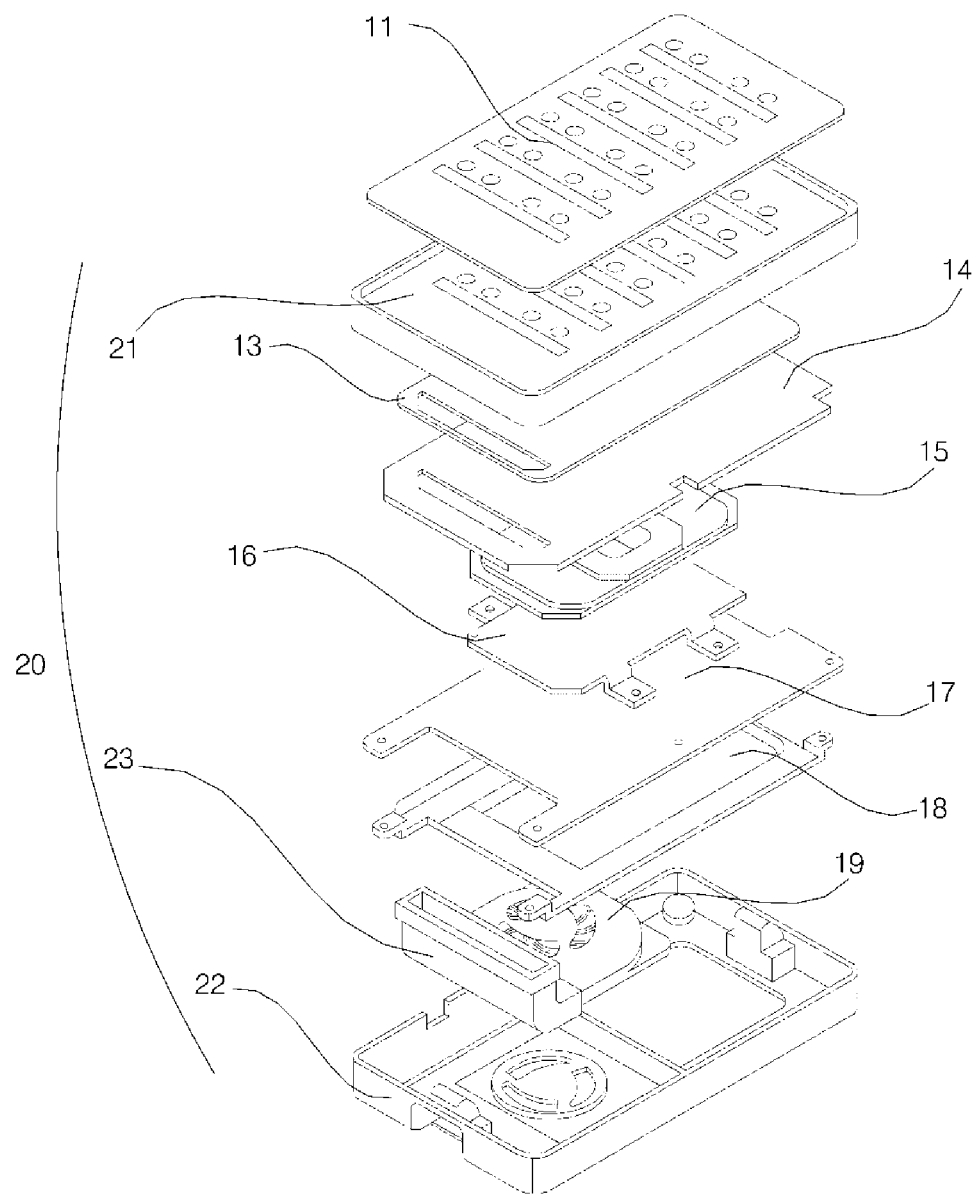
FIG. 5A is an exploded perspective view of a wireless charger for a mobile terminal in a vehicle according to an embodiment of the present invention.
Figure 5B:
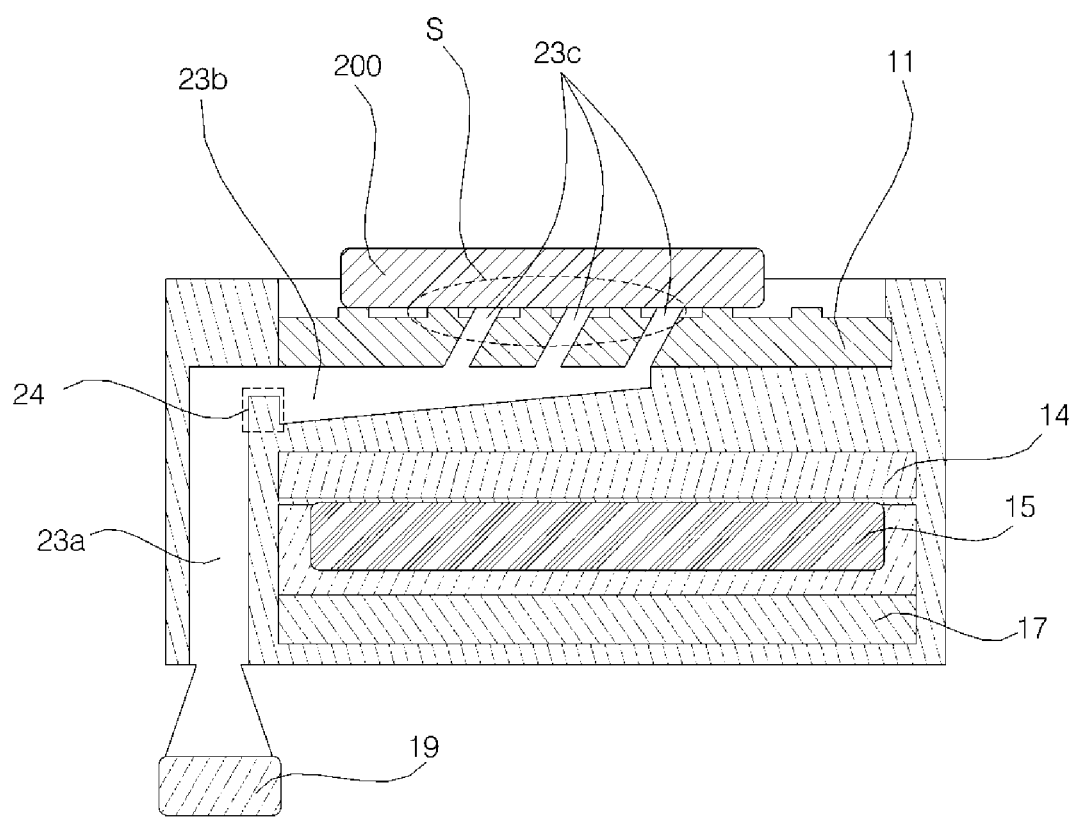
FIG. 5B is a cross-sectional view taken along line VB-VB in FIG. 4.

FIG. 4 is a perspective view of a wireless charger for a mobile terminal in a vehicle according to an embodiment of the present invention. FIG. 5A is an exploded perspective view of a wireless charger for a mobile terminal in a vehicle according to an embodiment of the present invention. FIG. 5B is a cross-sectional view taken along line VB-VB in FIG. 4. FIG. 6 is a diagram illustrating a wireless charging system according to an embodiment of the present invention.

Referring to FIGS. 4 to 6, the wireless charger 100 may include a tray 11, a plate 13, a coupling antenna 14, a coil part 15, a coil bracket 16, a driving part 17, a heat sink 18, a fan module 19, and a case 20. In some embodiments, the wireless charger 100 may include fewer than all of the aforementioned elements or may include additional elements.

The mobile terminal 200 may be placed on the tray 100. The tray 11 may include one or more holes. Each of the holes in the tray 11 may have a predetermined size. For example, a plurality of holes may have a size of 1 mm$^2$ in consideration of airflow resistance and the need of blocking foreign substances from entering into the wireless charger.

The plate 13 may be disposed between a first case 21 and a coupling antenna 14. The plate 13 may support the first case 21. In some embodiments, the plate 13 may be omitted.

The coupling antenna 14 may be disposed below the tray 11. The coupling antenna 14 may be disposed above the transmitter coil 116. The coupling antenna 14 may transmit a mobile communication signal to the mobile terminal 200. An antenna provided in the vehicle 10 may receive the mobile communication signal. The coupling antenna 14 may receive the mobile communication signal that is received through the antenna provided in the vehicle 10. The coupling antenna 14 may transmit the mobile communication signal to the mobile terminal 200. The coupling antenna 14 may also amplify the received mobile communication signal and transmit the amplified signal to the mobile terminal 200.

If the vehicle 10 travels in an area such as mountain, tunnel, or an underpass in which a reception rate of mobile communication signals is poor, the mobile terminal 200 may not receive a mobile communication signal. In this case, the coupling antenna 14 may receive a mobile communication signal through an antenna having an excellent signal receiving rate, which is provided in the vehicle 10, and transmit the received mobile communication signal to the mobile terminal 200. Through the coupling antenna, the mobile terminal 200 may receive a mobile communication signal without disruption even in an area with a poor signal receiving rate. By receiving the mobile communication signal without disruption, the mobile terminal 200 may provide a user with various functions (for example, a TPEG navigation function) based on the mobile communication signal.

The coupling antenna 14 may include a near field communication (NFC) antenna. The NFC antenna may receive information from the mobile terminal 200. For example, the NFC antenna may receive information on temperature of the mobile terminal 200 from the mobile terminal 200. The NFC antenna may receive information on electrical energy required for wireless charging from the mobile terminal 200. In some embodiments, the coupling antenna 14 may be omitted.

The transmitter coil 116 (see FIG. 6) may be disposed below the tray 11. The transmitter coil 116 may be disposed below the coupling antenna 14. The transmitter coil 116 may be disposed above a driving part 17. The transmitter coil 116 may operate in accordance with a driving signal provided by the driving part 17. The transmitter coil 116 may be electrically connected to the driving part 17. Specifically, the transmitter coil 116 may be electrically connected to a processor 170 (see FIG. 6), included in the driving part 17, and operate under control of the processor 170.

The transmitter coil 116 may wirelessly provide electrical energy to the mobile terminal 200. For example, the transmitter coil 116 may provide electrical energy to the mobile terminal 200 based on inductive coupling or resonance coupling.

The coil bracket 16 may be disposed below the transmitter coil 116. The coil bracket 16 may be disposed above the driving part 17. The coil bracket 16 may fix the transmitter coil 116. For example, the coil bracket 16 may secure the transmitter coil 116 to the driving part 17 using a fastening connection such as a screw.

The driving part 17 may be disposed below the transmitter coil 116. The driving part 17 may drive the transmitter coil 116. The driving part 17 may include a circuit board and the processor 170 (see FIG. 6). The circuit board may include a Printed Circuit Board (PCB). A plurality of devices, such as an interface unit 130 (see FIG. 6), a processor 170 (see FIG. 6), a memory 140 (see FIG. 6), and a fan driving unit, may be mounted on the circuit board. The fan driving unit may drive a fan included in the fan module 19. The fan driving unit may operate under control of the processor 170.

The processor 170 may be mounted on the circuit board. The processor 170 may control the transmitter coil 116. By providing an electric signal to the transmitter coil 116, the processor 170 may drive the transmitter coil 116 so as to wirelessly provide electrical energy to the mobile terminal 200.

The processor 170 may include at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The heat sink 18 may be disposed below the driving part 17. The heat sink 18 may be formed of a metal material, for example, the heat sink may be formed of an aluminum material. The heat sink 18 may discharge internal heat of the wireless charger 100 to the outside. For example, the heat sink 18 may discharge heat, generated by the transmitter coil 116 or the driving part 17, to the outside of the wireless charger 100.

The fan module 19 may be disposed below the driving part 17. In some embodiments, the fan module 19 may be disposed above the tray 11. The fan module 19 may induce air to circulate in an air path 23. The fan module 19 may discharge air toward the mobile terminal 200 through holes included in the tray 11 or suction ambient air from around the mobile terminal 200, whereby heat generated by wireless charging may be removed.

The fan module 19 may include one or more fans. The fan module 19 may discharge or suction air by rotating the one or more fans. For example, the fan module 19 may include a first fan and a second fan. In this case, the first fan discharges or suctions air through a first air path and the second fan discharges or suctions air through a second air path. The first air path may be connected to a hole included in the tray 11. The second air path may be disposed between the transmitter coil 116 and the driving part 17, between the coupling antenna 14 and the transmitter coil 116, or between the coupling antenna 14 and the plate 13. The fan module 19 may include at least one selected from among a rotating fan, a solid state fan, a piezoelectric fan, a blower fan, an axial flow fan, and a mixed flow fan.

Meanwhile, in order to reduce vibration and noise caused by driving of a fan, a vibration absorber may be used in an area where a fan of the fan module 19 comes into contact with another component.

The case 20 may define the exterior appearance of the wireless charger 100. The case 20 may have an inner space in which each component of the wireless charger 100 is accommodated and protected. For example, the case 20 may accommodate the transmitter coil 116 and the driving part 17. The case 20 may include a top case 21, a bottom case 22, and an air path 23.

The air path 23 may be formed in the case 20. The air path 23 may be connected to a space accommodating the fan module 19 such that one side of the air path 23 is connected to the space accommodating the fan module 19. The space accommodating the fan module 19 may be referred to as a fan module accommodator.

The air path 23 may be connected to a space outside of the wireless charger 100 through holes included in the tray 11 such that the other side of the air path 23 is connected to the outside of the wireless charger 100 through the holes. The space outside of the wireless charger connected through the holes may be a space where the mobile terminal 200 is placed. The space where the mobile terminal 200 is placed may be referred to as a seat for the mobile terminal 200.

The air path 23 may include a first air passage 23a, a second air passage 23b, and a third air passage 23c. The first air passage 23a may be formed in a first direction. The first direction may be a vertical direction (for example, an overall height direction of the vehicle). One end of the first air passage 23a may be connected to a fan module accommodator which accommodates the fan module 19. The second air passage 23b may be formed in a second direction. The second direction may be a horizontal direction (for example, an overall length direction or an overall width direction of the vehicle). The second air passage 23b may extend from the other end of the first air passage 23a. One end of the second air passage 23b may be connected to the other end of the first air passage 23a. The third air passage 23c may be formed in a third direction. The third direction may be a direction at a predetermined angle (for example, 0 to 50 degrees) relative to the first direction. The third direction may be a direction at a predetermined angle (for example, 40 to 90 degrees) relative to the second direction. The third air passage 23c may extend from the other end of the second air passage 23b. One end of the third air passage 23c may be connected to one end of the second air passage 23b and the other end of the third air passage 23c may be connected through a hole included in the tray 11 to a space where the mobile terminal 200 is placed.

The air path 23 may be formed such that the more distal from the fan module 19, the smaller cross section will be. Accordingly, air may be discharged at a higher speed upon operation of fans, thereby increasing heat removal performance. For example, the first air passage 23a may be formed such that a cross section gradually becomes smaller in a direction from one end to the other end. The second air passage 23b may be formed such that a cross section gradually becomes smaller in a direction from one end to the other end. The third air passage 23c may be formed such that a cross section gradually becomes smaller in a direction from one end to the other end.

The wireless charger 100 may further include a foreign substance blocking part 24. The foreign substance blocking part 24 may be formed in the air path 23. The foreign substance blocking part 24 may block a foreign substance coming from the outside into the air path 23 through holes included in the tray 11. For example, if liquid comes in through the holes, the foreign substance blocking part 24 may prevent the liquid from reaching the fan driver 19.

The foreign substance blocking part 24 may be formed in a portion in which the first air passage 23a and the second air flow 23b are connected. The foreign substance blocking part 24 may be a partition wall formed in the first direction (for example, an overall height direction of the vehicle). A foreign substance flowing into the second air passage 23b is blocked by the foreign substance blocking part 24 and thus fails to reach the first air passage 23a. As a result, malfunction of the fan module 19 may be prevented.

Meanwhile, the tray 11 may be detachable from the case 20, which would make it possible to remove foreign substances blocked by the foreign substance blocking part 24 after detaching the tray 11.

Referring to FIG. 6, a wireless charging system may include a wireless charger 100 and one or more mobile terminals 200. The wireless charger 100 may include a power transmitter 110 and a processor 170. The wireless charger 100 may further include a receiving unit 120, an interface unit 130, a memory 140, and an output unit 150 individually or in combinations thereof. The power transmitter 110, the receiving unit 120, the interface unit 130, the memory 140, the output unit 150, and the processor 170 may be connected electrically. In some embodiments, the wireless charger 100 may further include components which are not described herein.

The power transmitter 110 may operate under control of the processor 170. The power transmitter 110 may wirelessly transmit power to one or more mobile terminals 200. For example, the power transmitter 110 may wirelessly transmit power to a first mobile terminal 200a. The power transmitter 110 may convert power supplied from a battery provided in the vehicle 10 into a wireless power signal and transmit the wireless power signal to the mobile terminal 200. The wireless power signal transmitted by the power transmitter 110 may be in the form of an oscillating magnetic field or electro-magnetic field.

The power transmitter 110 may transmit power to the mobile terminal 200 based on at least one of inductive coupling and resonance coupling.

In the case where power is transmitted based on inductive coupling, when the intensity of a current flowing in the transmitter coil 116 of the transmitter 110 is changed, a magnetic field passing through the transmitter coil 116 may be changed by the current. The changed magnetic field causes an induced electromotive force to be generated on the side of the receiver coil 216 of the mobile terminal 200. Based on the induced electromotive force, electrical energy is supplied to the mobile terminal 200.

In the case where power is transmitted based on resonance coupling, a magnetic field having a specific resonant frequency is formed in the power transmitter 110 by alternating power. In the case where resonance occurs in the transmitter 110 due to the formed magnetic field, power is generated in the mobile terminal 200 due to the resonance.

In order to transmit power based on resonance coupling, the power transmitter 110 may further include a resonant circuit. The resonant circuit may be implemented using capacitors. The resonant frequency may be determined based on inductance of the transmitter coil 116 and capacitance of the resonant circuit. In order to transmit power based on resonance coupling, the mobile terminal 200 may further include a resonant circuit. The resonant circuit may be configured such that a resonant frequency formed based on inductance of the receiver coil 216 and capacitance of the resonant circuit is equal to a resonant frequency of a magnetic field formed by the power transmitter 110.

The power transmitter 110 may include a DC-DC converter 111, an inverter 112, a power sensing unit 113, and a transmitter coil 116. The DC-DC converter 111 may step up or down DC power, which is provided from a vehicle battery, to be adequate power for transmission. The DC-DC converter 111 may operate based on an electrical signal provided from the processor 170.

The inverter 112 may include a DC-AC inverter. For example, the inverter 112 may include a full bridge circuit. The DC-AC inverter may invert DC power, stepped up or down by the DC-DC converter, into AC power. The inverter 112 may operate based on an electrical signal provided from the processor 170.

The power sensing unit 113 may monitor a current or voltage flowing in the transmitter coil 116. The power sensing unit 113 may operate based on an electrical signal provided from the processor 170.

The transmitter coil 116 may wirelessly transmit power based on AC power inverted by the inverter 112. The transmitter coil 116 may form a magnetic field based on variation of a current. The transmitter coil 116 may be implemented in a flat spiral form or in a cylindrical solenoid form. The transmitter coils 116 may operate based on an electrical signal provided from the processor 170.

The power transmitter 110 may include a plurality of transmitter coils 116. The plurality of transmitter coils 116 may wirelessly transmit power to a plurality of mobile terminals 200. For example, the power transmitter 110 may include a first transmitter coil and a second transmitter coil. The first transmitter coil may wirelessly transmit power to a first mobile terminal. The second transmitter coil may wirelessly transmit power to a second mobile terminal.

In some embodiments, if the power transmitter 110 includes a plurality of transmitter coils, it is possible to transmit power to at least some of the transmitter coils based on inductive coupling while transmitting power to the rest of the transmitter coils based on resonance coupling.

In some embodiments, the power transmitter 110 may further include a parameter adjustment unit 114. The parameter adjustment unit 114 may adjust one or more parameters of power, which may include voltage, current, impedance, and frequency, that affect generation of power. The parameter adjustment unit 114 may include one or more of a device, a passive element, or an active element which is able to vary a parameter. The parameter adjustment unit 114 may operate based on an electrical signal provided from the processor 170.

According to an embodiment, the converter 111 and the inverter 112 may be constructed as subcomponents of the parameter adjustment unit 114.

The processor 170 may control overall operation of each unit of the wireless charger 100.

The processor 170 may acquire model information of the first mobile terminal 200a to be subjected to wireless charging. The model information may include at least one of ID information, manufacturer information, manufacture date information, country-of-manufacture information, country-of-consumption information, product feature information, and product information of the first mobile terminal 200a. The product feature information may include wireless charging-related information of the mobile terminal 200. For example, the product feature information may include impedance information and resonant frequency information of the first mobile terminal 200a.

The processor 170 may acquire the model information of the mobile terminal 200 based on packet data received by the receiver 120. Alternatively, the processor 170 may acquire the model information of the first mobile terminal 200a based on frequency response characteristic data of the first mobile terminal 200a.

The processor 170 may acquire frequency characteristic data of power that is transmitted from the transmitter 110 to the first mobile terminal 200a. Frequency characteristic data of power may include frequency characteristic data of a current flowing in the transmitter coil 116. For example, the processor 170 may monitor a current flowing in the transmitter coil 116 using the power sensing unit 113. The processor 170 may convert a time domain value of the current flowing in the transmitter coil 116 into a frequency domain value so as to acquire frequency characteristics of the current. The processor 170 may acquire frequency characteristic data of power based on the frequency characteristics of the current.

The processor 170 may acquire the model information of the first mobile terminal 200a by comparing frequency response characteristic data for each mobile terminal model and frequency characteristic data of power.

Frequency characteristics of a current flowing in the transmitter coil 116 differ depending on impedance characteristics of an object placed on the tray 11. Alternatively, frequency characteristics of power transmitted via the transmitter coil 116 differ depending on impedance characteristics of an object placed on the tray 11.

The processor 170 may acquire model information of the mobile terminal 200 by comparing power frequency characteristic data of each mobile terminal model, which is pre-stored in the memory 140, and sensing data-based frequency characteristic data which is based on sensing data.

For example, the processor 170 may determine that the sensing data based-frequency characteristic data coincides with frequency characteristic data of the first mobile terminal 200a out of power frequency characteristic data for each model of the mobile terminal 200 which is stored in the memory 140. In this case, the processor 170 may determine that an object placed on a tray 11 is the first mobile terminal 200a.

The processor 170 may adjust, based on the acquired model information, parameters of power that is transmitted via the power transmitter 110. By controlling the parameter adjustment unit 114, the processor 170 may adjust the parameters of the transmitted power. For example, the processor 170 may adjust power parameter based on impedance information of the first mobile terminal 200a so that power in a state suitable for impedance of the first mobile terminal 200a can be transmitted. The processor 170 may adjust a power parameter based on resonant frequency information of the first mobile terminal 200a so that power in a state suitable for a resonant frequency of the first mobile terminal 200a can be transmitted. The processor 170 may adjust a power parameter based on country-of-consumption information of the first mobile terminal 200a so that power can be transmitted within a range of frequencies in which wireless charging is allowed within a country of consumption.

The processor 170 may detect a foreign object FO by comparing frequency response characteristic data for each mobile terminal model and frequency characteristic data of power. Based on the model information of the first mobile terminal 200a, the processor 170 may receive frequency response characteristic data of the first mobile terminal 200a stored in the memory 140. Then, the processor 170 may detect a foreign object FO by comparing the frequency response characteristic data of the first mobile terminal 200a and the frequency characteristic data of power. For example, the processor 170 may determine that frequency characteristic data based on the sensing data does not coincide with frequency response characteristic data of the first mobile terminal 200a pre-stored in the memory 140. In this case, the processor 170 may determine that a foreign object FO is present between the first mobile terminal 200a and the tray 11.

If the foreign object FO is placed between the first mobile terminal 200a and the tray 11, impedance of a load to be charged may be different from impedance of the first mobile terminal 200a, from a perspective of the first mobile terminal 200a.

The foreign object FO may be a metallic foreign object, such as a coin, a clip, a pin, and a key holder. If wireless charging is performed while a metallic foreign object is placed between the tray 11 and the mobile terminal 200, the wireless charging may not be performed efficiently or may possibly cause a fire. In this case, the wireless charging needs to be stopped or it is necessary to notify a user of the presence of the foreign object FO so that the user can remove it.

For example, the processor 170 may detect a foreign object FO by comparing a gradient of the first section of a frequency response characteristic graph of the first mobile terminal 200a with a gradient of the first section of a power frequency graph. If it is determined that a foreign object is detected, the processor 170 may control the power transmitter 110 so that power is not transmitted to the first mobile terminal 200a. As such, by controlling the wireless charger so that power is not transmitted to the first mobile terminal 200a, it is possible to prevent a fire.

If it is determined that a foreign object is detected, the processor 170 may provide information on the detection of the foreign object to a user interface apparatus through an interface unit 130. As such, by notifying the presence of the foreign object through the user interface apparatus, it is possible to induce removal of the foreign object by a user.

In an embodiment where the power transmitter 110 includes a plurality of transmitter coils, the processor 170 may acquire frequency characteristic data of power from each of the transmitter coils. In this case, based on the frequency characteristic data of power acquired from each of the plurality of transmitter coils, the processor 170 may determine a transmitter coil, from among the plurality of transmitter coils, via which power is to be wirelessly transmitted to the first mobile terminal 200a.

For example, in the case where the first mobile terminal 200a is positioned at a location corresponding to a first transmitter coil among the plurality of transmitter coils, frequency characteristic data of power transmitted via the first transmitter coil coincides with frequency response characteristic data of the first mobile terminal 200a stored in the memory 140. In this case, the processor 170 may determine the first transmitter coil to be a transmitter coil via which power is to be wirelessly transmitted to the first mobile terminal 200a.

The processor 170 may detect foreign objects located in areas respectively corresponding to the plurality of transmitter coils, by comparing frequency response characteristic data for each mobile terminal model and frequency characteristic data of power acquired from each of the multiple transmitter coils.

The processor 170 may control operation of an indicator or one of multiple indicators based on information about whether a foreign object is detected and information about an area from which the foreign object is detected.

The power transmitter 110 may include a first transmitter coil and a second transmitter coil. The processor 170 may acquire model information of a first mobile terminal and model information of a second mobile terminal. The processor 170 may wirelessly transmit power, which is dependent upon parameters adjusted based on the model information of the first mobile terminal, to the first mobile terminal via the first transmitter coil. The processor 170 may wirelessly transmit power, which is dependent upon parameters adjusted based on the model information of the second mobile terminal, to the second mobile terminal via the second transmitter coil.

The processor 170 may receive driving situation information. The processor 170 may control driving of a fan module based on the driving situation information. For example, the processor 170 may control a rotation speed of a fan included in the fan module 19 based on driving speed information of a vehicle 10. The processor 170 may control the rotation speed of the fan by controlling of the fan driving unit. The processor 170 may control a rotation speed of a fan in proportion to a driving speed of the vehicle 10. If the speed of the vehicle 10 is reduced, the processor 170 may control the rotation speed of the fan to be reduced gradually. If the speed of the vehicle 10 is increased, the processor 170 may control the rotation speed of the fan to be increased gradually.

During driving at a low speed, noise is generated by the driving of the fan, and therefore, a user may hear loud noise caused by driving of the fan module 19. In this case, by reducing a rotation speed of the fan, it is possible to prevent the user from recognizing the noise caused by the driving of the fan module 19.

During driving at a high speed, noise is generated by the driving of the vehicle, and, therefore, a user may not hear noise caused by driving of the fan module 19. In this case, by increasing a rotation speed of the fan, it is possible to quickly and efficiently remove heat generated by wireless charging.

The processor 170 may acquire temperature information of the mobile terminal 200. For example, the processor 170 may receive temperature information of the mobile terminal 200 from the mobile terminal 200 via the receiving unit 120. The processor 170 may control the fan module 19 to operate for a predetermined period of time after wireless charging of the mobile terminal 200 is complete.

Even when the wireless charging of the mobile terminal 200 is complete, heat generated by the wireless charging may remain. It is possible to remove the remaining heat by driving the fan module 19 for a predetermined period of time even after the completion of the wireless charging.

The receiver 120 may receive data from the mobile terminal 200. For example, the receiving unit 120 may receive packet data from the mobile terminal 200.

The interface unit 130 may exchange information, data, or a signal with another apparatus included in the vehicle 10. The interface unit 130 may transmit received information, data, or signal to the processor 170. The interface unit 130 may transmit information, data, or a signal generated or processed by the processor 170 to another apparatus included in the vehicle 10.

The interface unit 130 may receive driving situation information. The driving situation information may include at least one of information on an object outside the vehicle, navigation information, and vehicle state information.

The information on the object may include information about presence of the object, information about a location of the object, information about a distance between the vehicle 10 and the object, and information about a speed of the vehicle 10 relative to the object.

The navigation information may include at least one of map information, information on a set destination, information on a route according to setting of the destination, information on various objects along the route, information on a lane, and information on a current location of the vehicle.

The vehicle state information may be information that is generated based on data which is sensed by various sensors provided inside the vehicle. For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface unit 130 may exchange a signal with a user interface apparatus for the vehicle. The user interface apparatus for the vehicle is an apparatus for communication between the vehicle 10 and a user. The user interface apparatus may receive a user input, and provide information, generated in the vehicle 10, to the user via a display apparatus or a sound output apparatus.

The memory 140 is electrically connected to the processor 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the wireless charger 100, such as programs for the processing or control of the processor 170. In some embodiments, the memory 140 may be integrally formed with the processor 170 or implemented as a subordinate component of the processor 170.

The memory 140 may store frequency response characteristic data for each model of the mobile terminal 200.

The frequency response characteristic data for each model of the mobile terminal 200 may include a lookup table of frequency response characteristic data for each model of the mobile terminal 200 based on power values. For example, the frequency response characteristic data may include a lookup table of frequency response characteristic data which are measurements of wirelessly transmission power for each model of the mobile terminal 200 on a unit basis of 1 W in a range of 5 W to 15 W.

The frequency response characteristic data for each model of the mobile terminal 200 may include a lookup table of spatial frequency characteristic data for each model of the mobile terminal 200 based on location information of the mobile terminal 200. For example, the frequency response characteristic data may include a lookup table of measurements of frequency response characteristic data for each model of the mobile terminal 200 based on a location of the mobile terminal 200 on the tray 11.

The output unit 150 may include one or more indicators. The indicator may be used to notify detection of a foreign object. Alternatively, the indicator may be used to notify whether wireless charging is possible. In the case where the power transmitter 110 includes a plurality of transmitter coils, the output unit 150 may include a plurality of indicators. In this case, the plurality of indicators may be arranged to correspond to the plurality of transmitter coils, respectively.

The mobile terminal 200 may include mobile phones, smart phones, laptop computers, digital broadcasting terminals, Personal Digital Assistants (PDAs), portable multimedia players (PMPs), navigation, slate PCs, tablet PCs, ultrabooks, and wearable devices such as smart watches, smart glasses, and Head Mounted Displays (HMDs).

The mobile terminal 200 may include a power receiver 210, a transmitter 220, a charging unit 240, a battery 250, and a controller 270. The power receiver 210 may receive power that is wirelessly transmitted from the wireless charger 100. The power receiver 210 may include a receiver coil 216, a rectifier 213, and a regulator 214. The transmitter 220 may transmit data to the wireless charger 100. For example, the transmitter 220 may transmit packet data to the wireless charger 100. The charging unit 240 may charge the battery 250 with power that is supplied via the power receiver 210. The controller 270 may control overall operation of each of the foregoing components of the mobile terminal 200.

Figure 7:
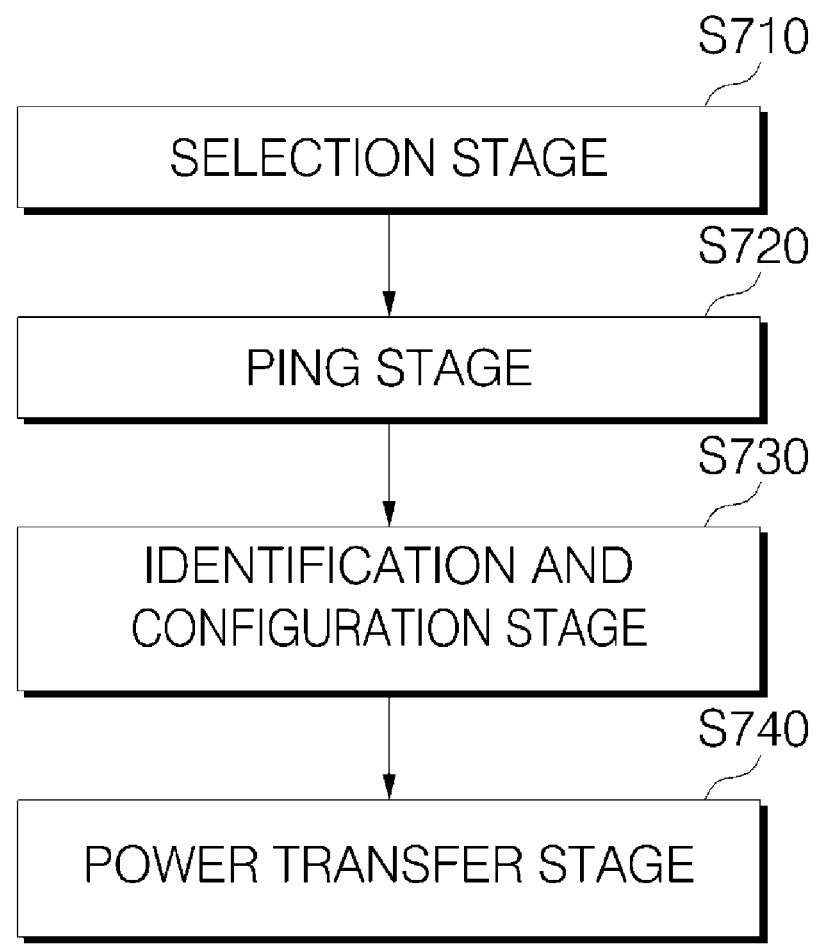
FIG. 7 is a flowchart illustrating operation of a wireless charger according to an embodiment of the present invention.

FIG. 7 is a flowchart illustrating operation of a wireless charger according to an embodiment of the present invention.

Referring to FIG. 7, in a selection stage S710, the processor 170 may perform a detection process to select the mobile terminal 200 located in a sensing area. The sensing area may indicate an area in which an object possibly affects characteristics of power of the power transmitter 110. The processor 170 may detect, via the power sensing unit 113, a change in power for forming a wireless power signal of the power transmitter 110. By doing so, the processor 170 may determine whether an object is present in an area of a specific range. Such a detection process may be referred to as analog ping. The aforementioned process of acquiring power frequency characteristic data of the processor 170 may be performed using the analog ping.

In a ping stage S720, the processor 170 may detect the mobile terminal 200 based on received packet data. Such a process of detection of the mobile terminal 200 may be referred to as digital ping. The packet data will be described in detail with reference to FIGS. 9A to 14.

In an identification and configuration stage S730, the processor 170 may acquire identification information and configuration information transmitted by the mobile terminal 200 in step S720. The processor 170 may acquire a message indicating the identification information from the packet data. The processor 170 may acquire a message indicating the configuration information from the packet data.

In a power transfer stage S740, the processor 170 may transmit power to the mobile terminal 200. Based on the configuration information, the processor 170 may adjust characteristics of power applied to a transmitter coil 116. For example, the processor 170 may adjust parameters of the power based on the configuration information. The processor 170 may acquire a control error message from the packet data. Based on a control error value contained in the control error message, the processor 170 may adjust power applied to the transmitter coil 116. The processor 170 may acquire an end power transfer message from the packet data. The processor 170 may end transmitting power based on the end power transfer message.

Figure 8:
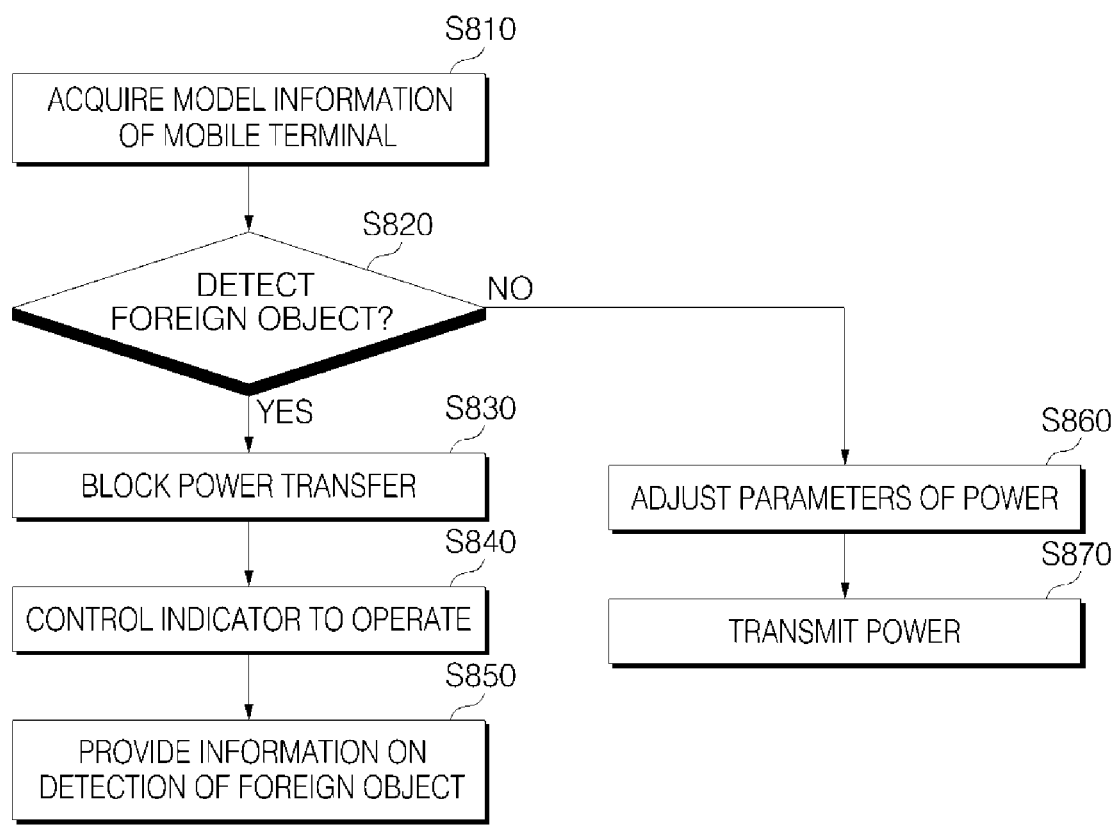
FIG. 8 is a flowchart illustrating operation of a wireless charger according to an embodiment of the present invention.

FIG. 8 is a flowchart illustrating operation of a wireless charger according to an embodiment of the present invention.

Referring to FIG. 8, the processor 170 may acquire model information of the mobile terminal 200 in step S810. Step S810 may be performed based on steps S710, S720, and S730 described above.

The processor 170 may determine whether a foreign object is detected in step S820. If a foreign object is not detected, the processor 170 may adjust parameters of power based on the model information of the mobile terminal 200 in step S860. The processor 170 may transmit the power to the mobile terminal 200 based on the adjusted parameters of the power in step S870. Steps S860 and S870 may be performed based on step S740 described above.

If an object is detected in step S820, the processor 170 may perform a control action to block power transfer in step S830. The processor 170 may control an indicator to operate in step S840. The processor 170 may provide information on detection of a foreign object to the user interface apparatus for the vehicle in step S850.

FIGS. 9A to 14 are diagrams illustrating packet data according to an embodiment of the present invention. The processor 170 may perform a control action based on a message included in the packet data.

Figure 9A:
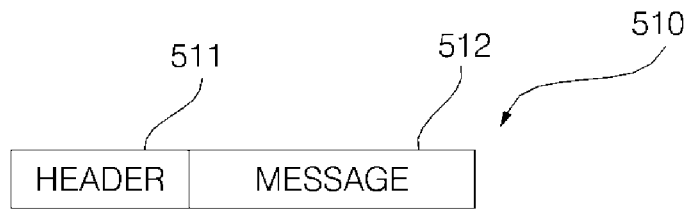
FIGS. 9A to 14 are diagrams illustrating packet data according to embodiments of the present invention.

Referring to FIG. 9A, the mobile charger 100 and the mobile terminal 200 may transmit and receive desired data in the form of a command packet 510. The packet data 510 may be configured to include a header 511 and a message 512.

The header 511 may include a field indicative of a type of data included in the message 512. The size and type of the message may be determined based on a value of the field indicative of the type of the data. The header 511 may include an address field indicative of a sender of the packet. For example, the address field may show identifier of the mobile terminal 200 or identifier of a group to which the mobile terminal 200 belongs. In the case where the mobile terminal 200 wishes to transmit the packet 510, the mobile terminal 200 may generate the packet 510 such that the packet 510 shows identification information of the mobile terminal 200.

The message 512 includes data which is desired by a sender of the packet 510. Data included in the message 512 may be a report, request, or response to a receiver.

Figure 9B:
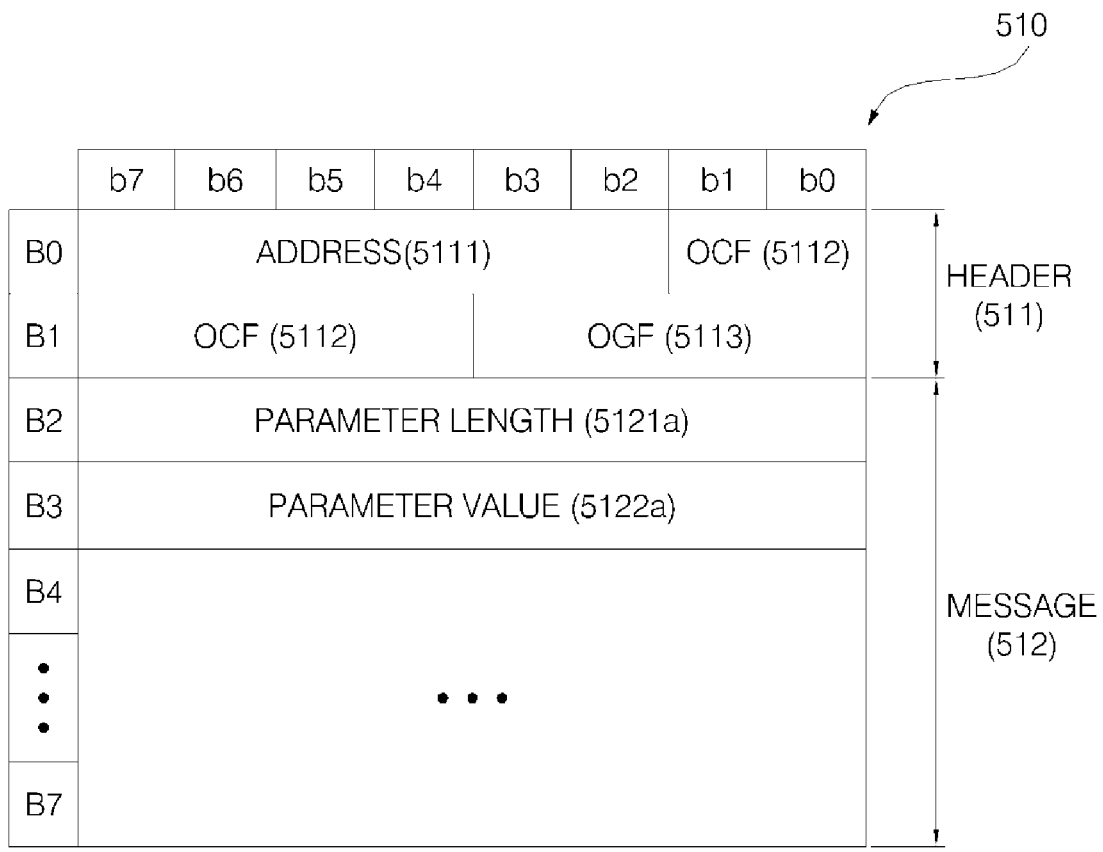

In some embodiments, the command packet 510 may be configured as shown in FIG. 9B. The header 511 contained in the packet 510 may have a predetermined size. For example, the header 511 may be two bytes. The header 511 may include a receiver address field 5111. For example, the receiver address field 5111 may have a size of six bits. The header 511 may include an Operation Command Field (OCF) 5112 or an Operation Group Field (OGF) 5113. The OGF 5113 is a value assigned to each command group for the mobile terminal 200, and the OCF 5112 is a value assigned to each command existing in each group to which the mobile terminal 200 belongs.

The message 512 may be divided into a parameter length field 5121*a*, and a parameter value field 5122*a*. That is, a sender of the packet 510 may be expressed in the form of a length-value pair (5121*a*-5122*a*, etc.) of at least one parameter required to express data which is to be transmitted via a message.

Figure 9C:
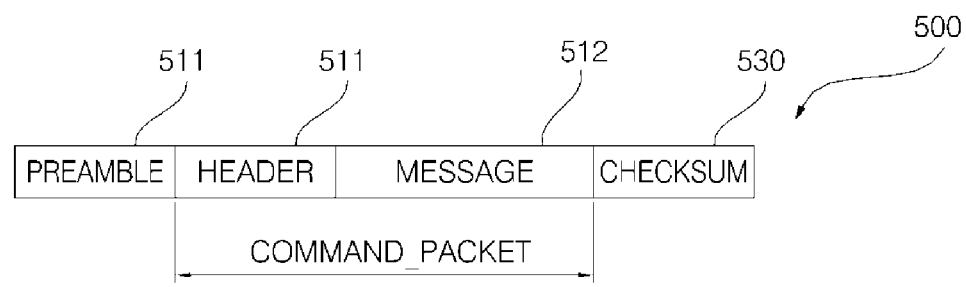

Referring to FIG. 9C, the wireless charger 100 and the mobile terminal 200 may transmit and receive data in the form of a packet in which a preamble 520 and a checksum 530 are added to transmit the command packet 510.

The preamble 520 is used for synchronization with data received by the wireless charger 100, and for detection of a start bit of the command packet 510. The preamble 520 may be configured such that the same bit is repeated. For example, the preamble 520 may be configured such that data bit "1" resulting from DBP encoding is repeated 11 times up to 25 times.

The checksum 530 is used for detection of an error that could possibly occur in the command packet 510 during transmission of a power control message.

Figure 10:
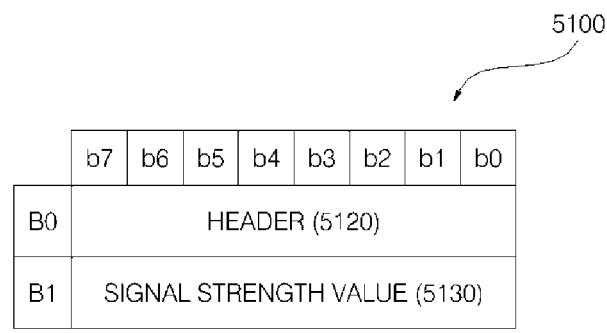

As illustrated in FIG. 10, packet data 5100 may include a header 5120 for notifying that the packet data 5100 is a packet indicating signal intensity and a message 5130 for showing intensity of a power signal that the mobile terminal 200 receives. The intensity of a power signal inside the message 5130 may be a value that indicates a degree of inductive coupling or resonance coupling for power transfer between the wireless charger 100 and the mobile terminal 200.

Figure 11A:
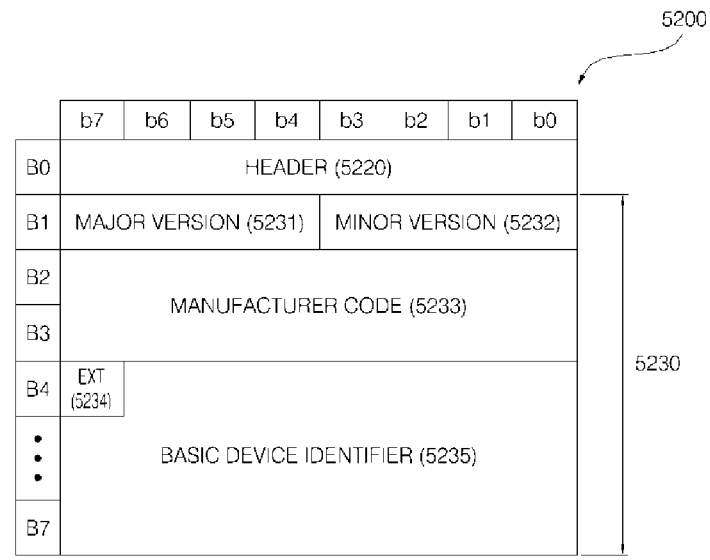

As illustrated in FIG. 11A, packet data 5200 may be configured to include a header 5220 for notifying that the packet data 5200 is a packet indicating identification information and a message 5230 including identification information of a mobile terminal.

The message 5230 may include information 5231 and 5232 indicating the version of a wireless power transfer standard, information 5233 for identification of a manufacturer of the mobile terminal 200, and information 5234 indicating the presence or absence of an extended device identifier, and a basic device identifier 5235.

Figure 11B:
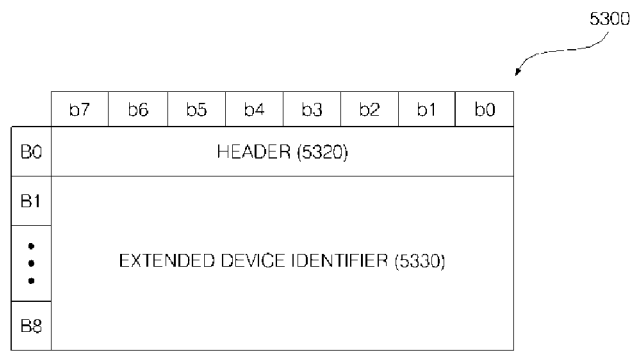

If the information 5234 indicates the presence of the extended device identifier, packet data 5300 may further include an extended identification packet 5330 including the extended device identifier, as shown in FIG. 11B.

The packet data 5300 may include a header 5320 for notifying that the packet data 5300 is a packet indicating an extended device identifier and a message 5330 including the extended device identifier. As such, if the extended device identifier is used, manufacturer identification information 5233, the basic device identifier 5235, and the extended identifier 5330 may be used to identify the mobile terminal 200.

Figure 12:
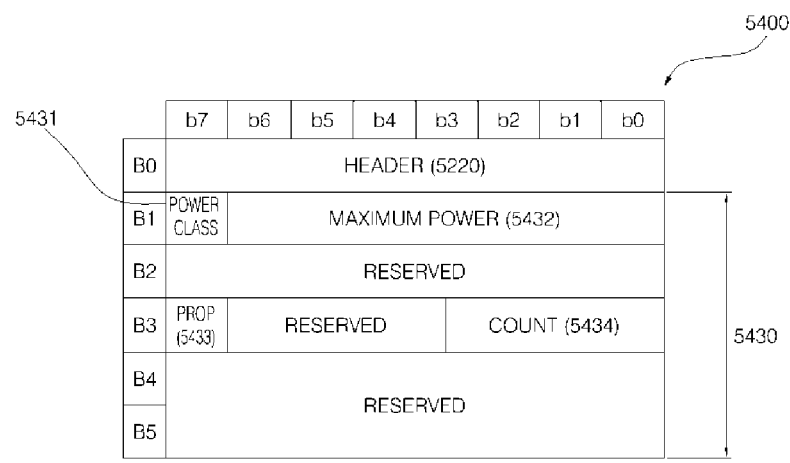

As illustrated in FIG. 12, packet data 5400 may include a header 5420 for notifying that the packet data 5400 is a configuration packet and a message 5430 including expected maximum power. The message 5430 may include power class 5431, information 5432 about expected maximum power, an identifier 5433 indicative of a method of determining a current of a major cell on the side of the wireless charger 100; and the count of selective configuration packets 5434. The indicator 5433 may indicate whether a current of a major cell on the side of the wireless charger 100 is determined as stated in the wireless power transfer standard.

Figure 13:
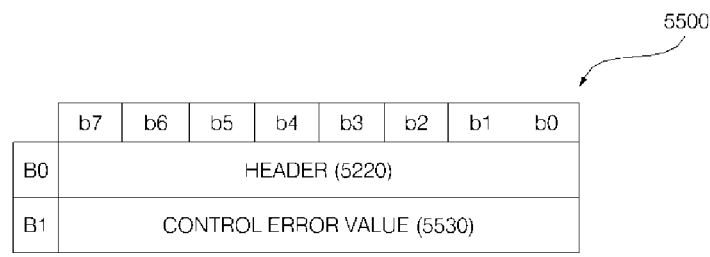

As illustrated in FIG. 13, packet data 5500 may include a header 5520 for notifying that the packet data 5500 is a control error packet and a message 5530 including a control error value. Based on the control error value, the wireless charger 100 may control power to be applied to the transmitter coil 116. That is, the power applied to the transmitter coil 116 may be maintained in response to a control error value of "0", reduced in response to a negative control error value, or increased in response to a positive control error value.

Figure 14:
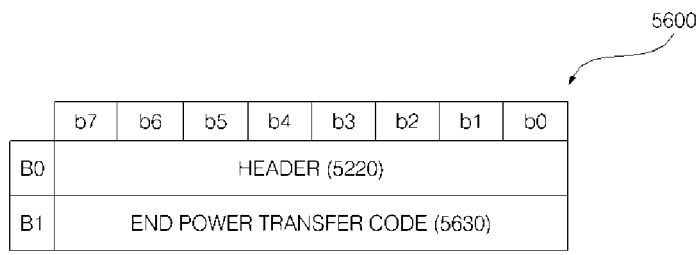

As illustrated in FIG. 14, packet data 5600 may include a header 5620 for notifying that the packet data 5600 is an end power transfer packet and a message 5630 including an end power transfer code which indicates a reason for the end. The end power transfer code may indicate any one of charge complete, internal fault, over temperature, over voltage, over current, battery failure, reconfigure, no response, and unknown fault.

Packet data may include a frequency, a duty cycle, and amplitude of power applied to the transmitter coil 116 at an operating point. In addition, packet data may include information about strength of a wireless power signal, and information about a degree of inductance coupling or resonance coupling.

FIG. 15 is a diagram illustrating frequency response characteristic data for various models of a mobile terminal according to an embodiment of the present invention. FIG. 15 is an example of a Frequency Response Shape (FRS) which shows frequency response characteristic data for various mobile terminal models. The X-axis represents frequencies ranging from 80 kHz to 120 KHz and the Y-axis represents power levels. The FRS may be acquired from experimental data.

Referring to FIG. 15, each mobile terminal 200 has different frequency response characteristics depending on a model thereof. By way of example, a first mobile terminal 200*a* has a maximum power value at 98 kHz while a second mobile terminal 200*b* has a maximum power value at 102 kHz. The memory 140 may store a lookup table of frequency response characteristic data for each mobile terminal model.

Meanwhile, a frequency response characteristics graph 1510 of the first mobile terminal 200*a* may consist of a graph 1510*a* corresponding to a first power value to a graph 1510*n* corresponding to the n-th power value. A plurality of graphs 1510*a* and 1510*n* may have a similar pattern, but differ in power levels. In this case, the memory 140 may store a lookup table of the frequency response characteristic data for each model of the mobile terminal 200 based on power values.

Figure 16A:
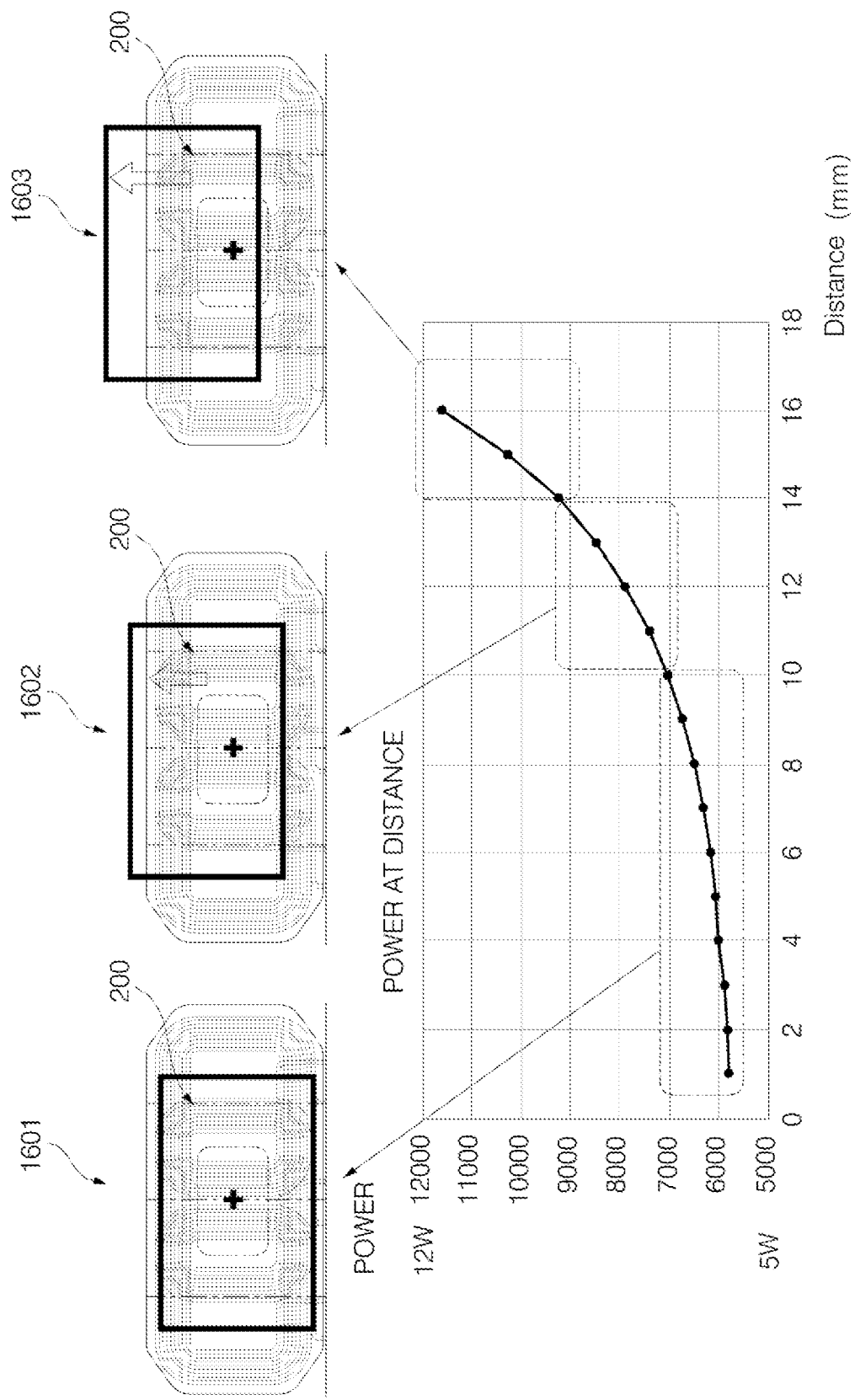
FIGS. 16A to 16B are diagrams illustrating frequency characteristic data based on a location of a mobile terminal according to an embodiment of the present invention.
Figure 16B:
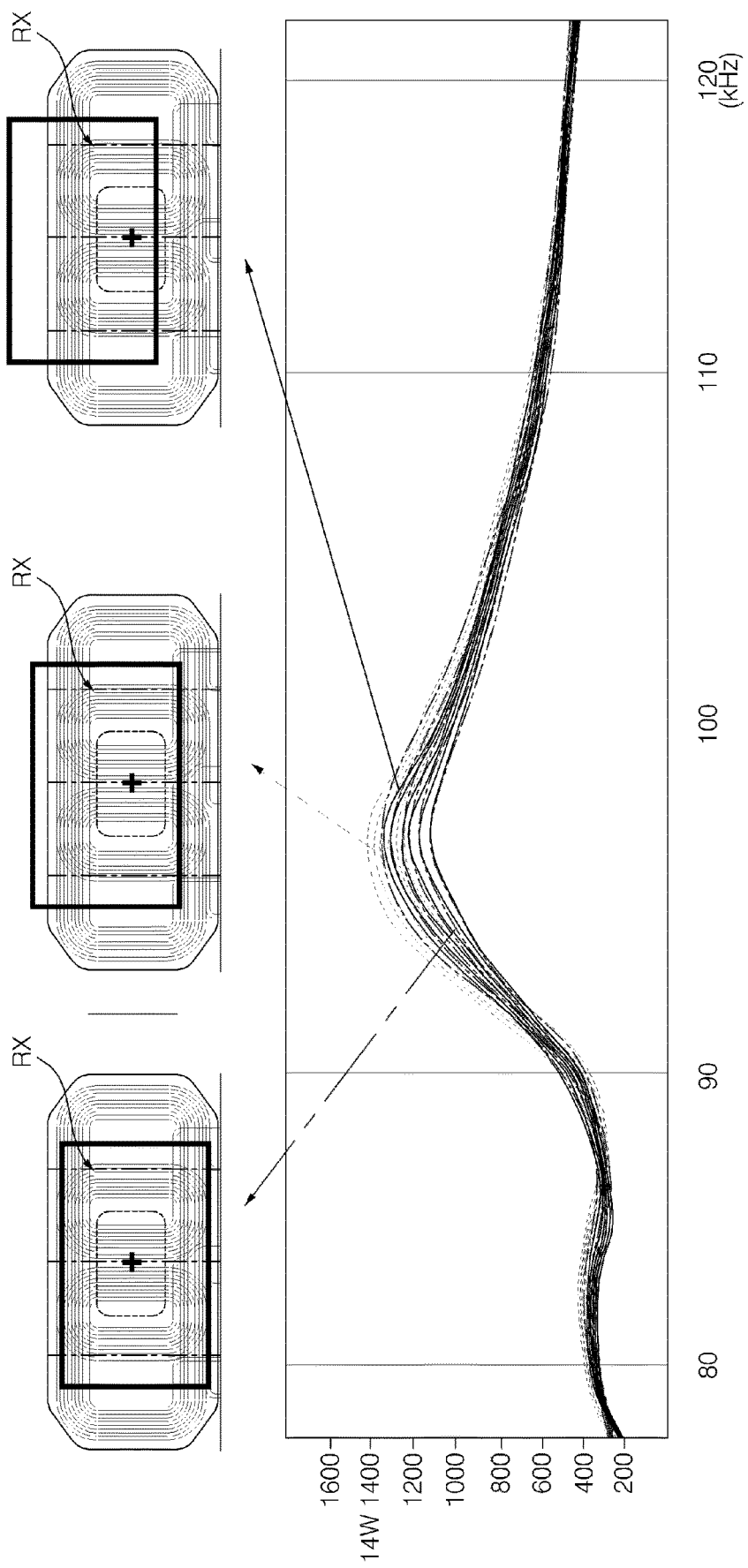

FIGS. 16A to 16B are diagrams illustrating frequency characteristic data based on a location of a mobile terminal according to an embodiment of the present invention.

Referring to FIG. 16A, the greater the distance between the mobile terminal 200 and the transmitter coil 116, the greater the amount of power required for wireless charging. In the case where the mobile terminal 200 is located in a first area on the tray 11 (1601), power required for wireless charging is 5 W to 7 W. In the case where the mobile terminal 200 is located in a second area on the tray 11 (1602), power required for wireless charging is 7 W to 9 W. In the case where the mobile terminal 200 is located in a third area on the tray 11 (1602), power required for wireless charging is 9 W to 12 W. The processor 170 can control the power transmitter accordingly.

As illustrated in 16B, a FRS is changed according to a location of the mobile terminal 200 on the tray 11. The greater the distance between the mobile terminal 200 and the transmitter coil 116, the higher the power level. The memory 140 may store a lookup table of spatial frequency characteristic data for each model of the mobile terminal 200 based on location information of the mobile terminal 200.

Figure 17:
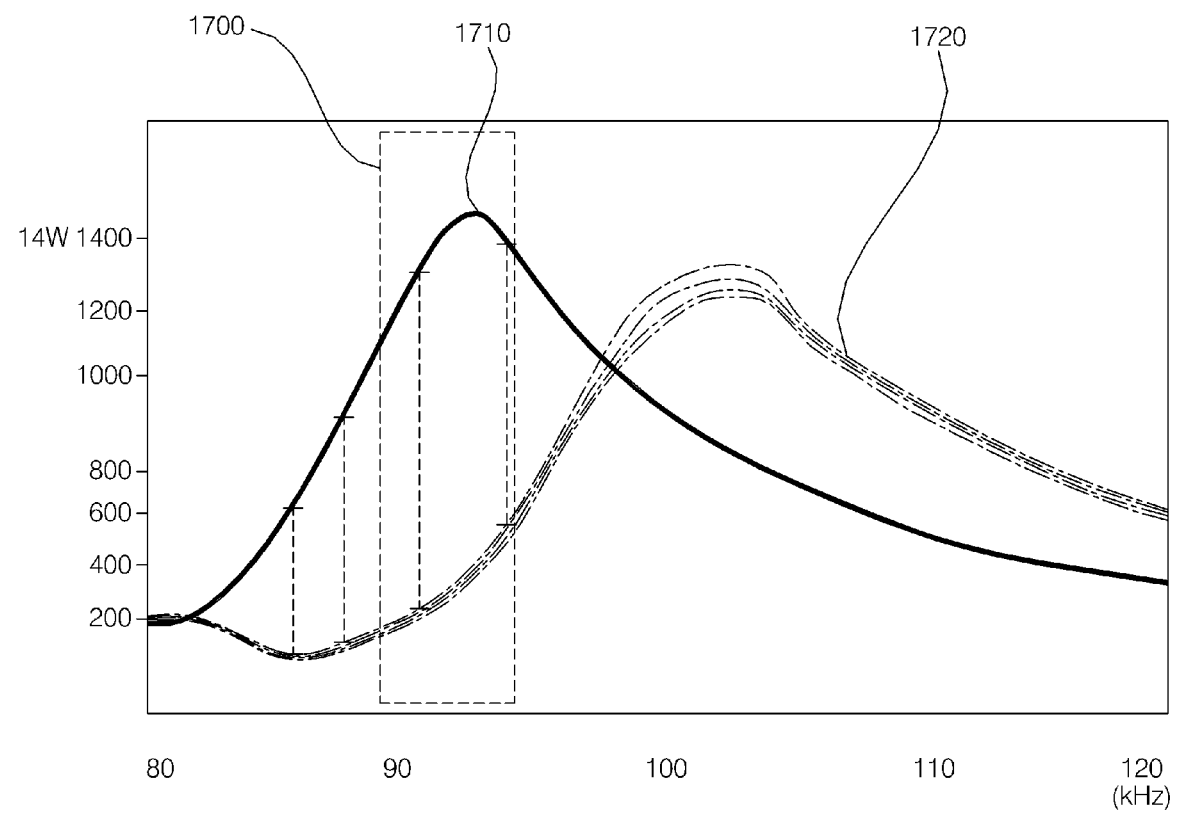
FIG. 17 is a diagram illustrating an operation of detecting a foreign object according to an embodiment of the present invention.

FIG. 17 is a diagram illustrating an operation of detecting a foreign object according to an embodiment of the present invention. In FIG. 17, reference numeral 1710 indicates a frequency response characteristics graph in the case where only the mobile terminal 200 is located on the tray 11. Reference numeral 1720 indicates a frequency response characteristics graph in the case where the mobile terminal 200 and a first object are located on the tray 11.

The processor 170 may acquire frequency characteristic data of power transmitted from the power transmitter 110 to the mobile terminal 200. Frequency characteristic data of power may include frequency characteristic data of a current flowing in the transmitter coil 116. For example, using the power sensing unit 113, the processor 170 may monitor the current flowing in the transmitter coil 116. The processor 170 may acquire frequency characteristics of the current flowing in the transmitter coil 116, by converting a time domain value of the current flowing in the transmitter coil 116 into a frequency domain value. The processor 170 may acquire frequency characteristic data of the power based on the frequency characteristics of the current.

The processor 170 may acquire model information of the mobile terminal 200 by comparing data stored in the memory 140 and the acquired frequency characteristic data of the power. After which, the processor 170 may detect a foreign object FO by comparing the acquired frequency characteristic data of the power with data stored in the memory 140. As illustrated in FIG. 17, the processor 170 may detect a foreign object FO by comparing a FRS 1720 with data 1710 stored in the memory 140. For example, the processor 170 may detect a foreign object based upon a difference between a gradient of the frequency response characteristic graph 1710 of the first mobile terminal 200a and a gradient of a measured power frequency graph 1720 in a first frequency section 1700 over a predetermined range. The processor 170 may then control the wireless charger as described above based on the detection or absence of the foreign object FO.

Figure 18A:
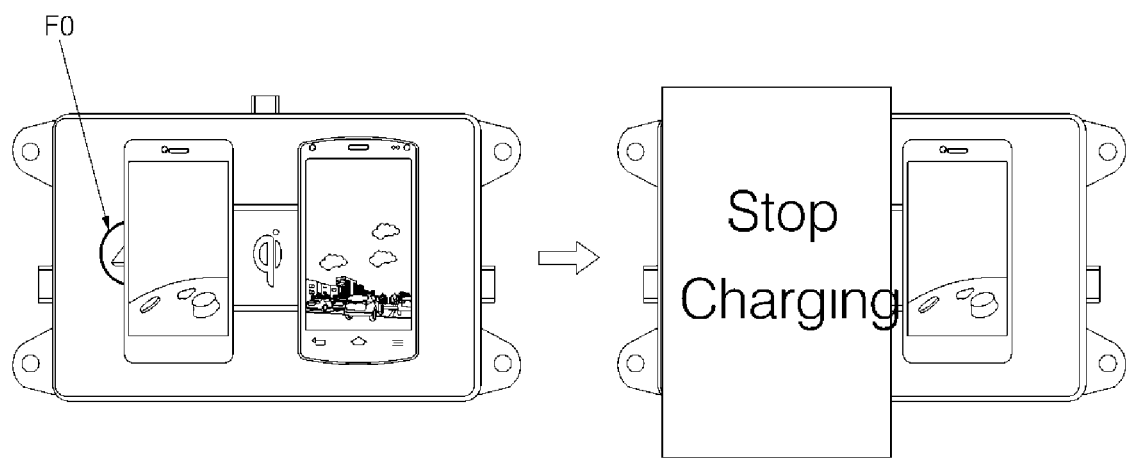
FIGS. 18A and 18B are diagrams illustrating how wireless charging is performed when a plurality of transmitter coils are provided, according to an embodiment of the present invention.
Figure 18B:
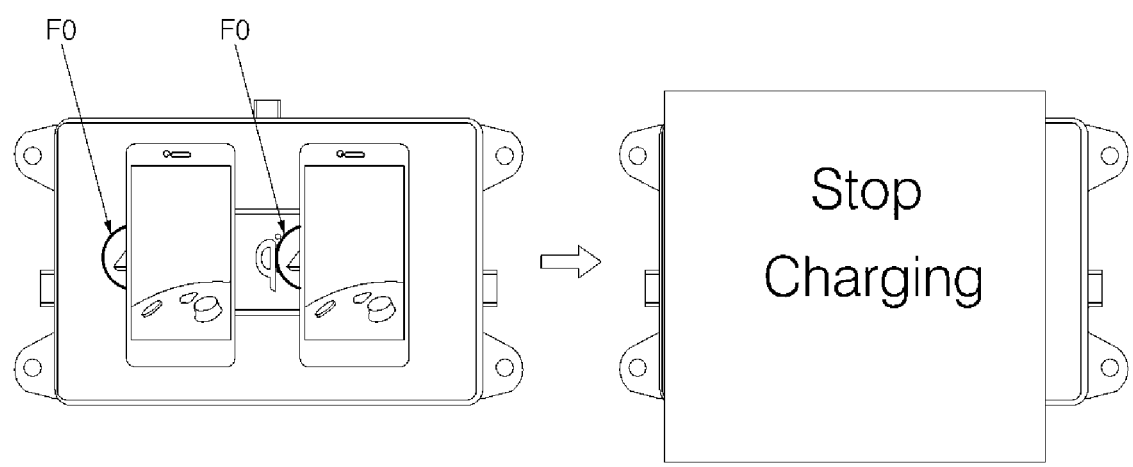

FIGS. 18A and 18B are diagrams illustrating how wireless charging is performed when a plurality of transmitter coils are provided according to an embodiment of the present invention.

In the case where the power transmitter 110 includes a plurality of transmitter coils, the processor 170 may acquire frequency characteristic data of power from each of the transmitter coils. The processor 170 may detect foreign objects located in areas respectively corresponding to the transmitter coils, by comparing frequency response characteristic data for each mobile terminal model and the frequency characteristic data of power acquired from each of the transmitter coils in a similar manner to that described above.

As illustrated in FIG. 18A, the processor 170 may determine whether a foreign object FO is located in a first area of the tray 11 which corresponds to a first transmitter coil from among a plurality of transmitter coils. In the case where the foreign object FO is located in the first area, the processor 170 may stop wireless charging via the first transmitter coil. At this point, if it is determined that a foreign object is not located in a second area, the processor 170 may perform wireless charging via a second transmitter coil.

As illustrated in FIG. 18B, if the processor 170 determines that foreign objects FOs are located on both the first area, which corresponds to the first transmitting coil from among the plurality of transmitter coils, and the second area, which corresponds to the second transmitting coil from among the plurality of transmitter coils, the processor 170 may stop wireless charging via the first and second transmitting coils.

Figure 19A:
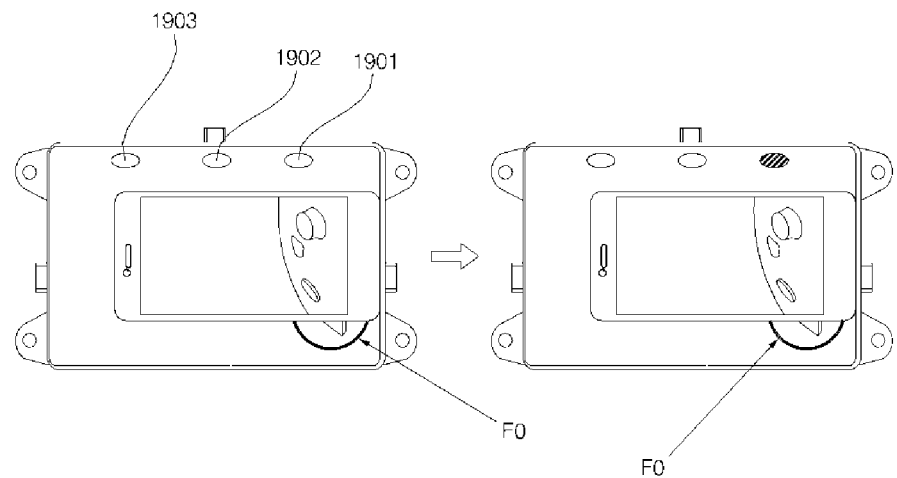
FIGS. 19A to 19C are diagrams illustrating operation of indicators according to an embodiment of the present invention.
Figure 19B:
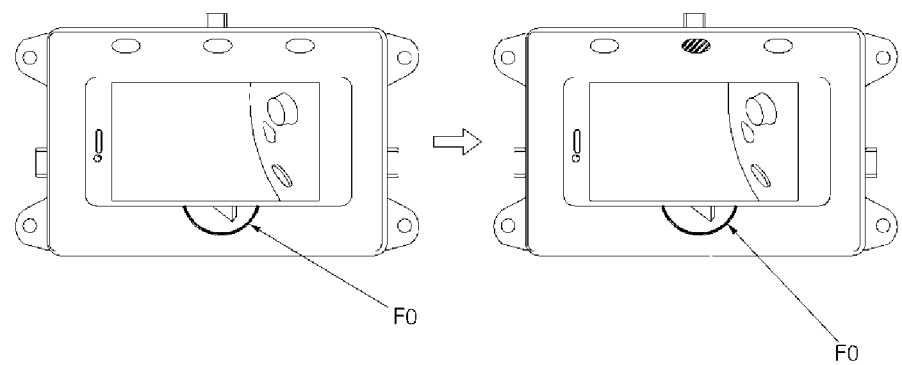
Figure 19C:
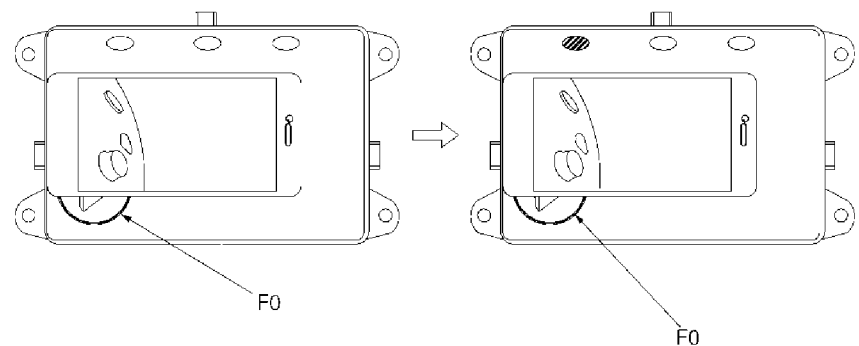

FIGS. 19A to 19C are diagrams illustrating operation of indicators according to an embodiment of the present invention. As shown in these FIGS., the wireless charger 100 may include a plurality of indicators 1901, 1902, and 1903, namely, a first indicator 1901 may be disposed at a location corresponding to the first transmitter coil, a second indicator 1902 may be disposed at a location corresponding to the second transmitter coil, and a third indicator 1903 may be disposed at a location corresponding to the third transmitter coil.

Based on whether a foreign object FO is detected, the processor 170 may control the plurality of indicators 1901, 1902, and 1903. For example, as illustrated in FIG. 19A, the processor 170 may detect a foreign object FO in a first area of the tray 11 which corresponds to the first transmitter coil. In this case, the processor 170 may control the first indicator 1901 to change to a first color (for example, red) and the processor 170 may control the second indicator 1902 and the third indicator 1903 to change to a second color (for example, green). In doing so, a user may check the color of the first to third indicators 1901, 1902, and 1903, and recognize that the foreign object FO is located in the first area.

As illustrated in FIG. 19B, the processor 170 may detect a foreign object FO in a second area of the tray 11 which corresponds to the second transmitter coil. In this case, the processor 170 may control the second indicator 1902 to change to a first color (for example, red) and the processor 170 may control the first indicator 1901 and the third indicator 1903 to change to a second color (for example, green).

Similarly, as illustrated in FIG. 19C, the processor 170 may detect a foreign object FO in a third area of the tray 11 which corresponds to the third transmitter coil. In this case, the processor 170 may control the third indicator 1903 to change to a first color (for example, red) and the processor 170 may control the first indicator 1901 and the second indicator 1902 to change to a second color (for example, green).

By providing this information to the user, the user can move or remove the foreign object FO to allow for wireless charging to proceed.

Figure 20:
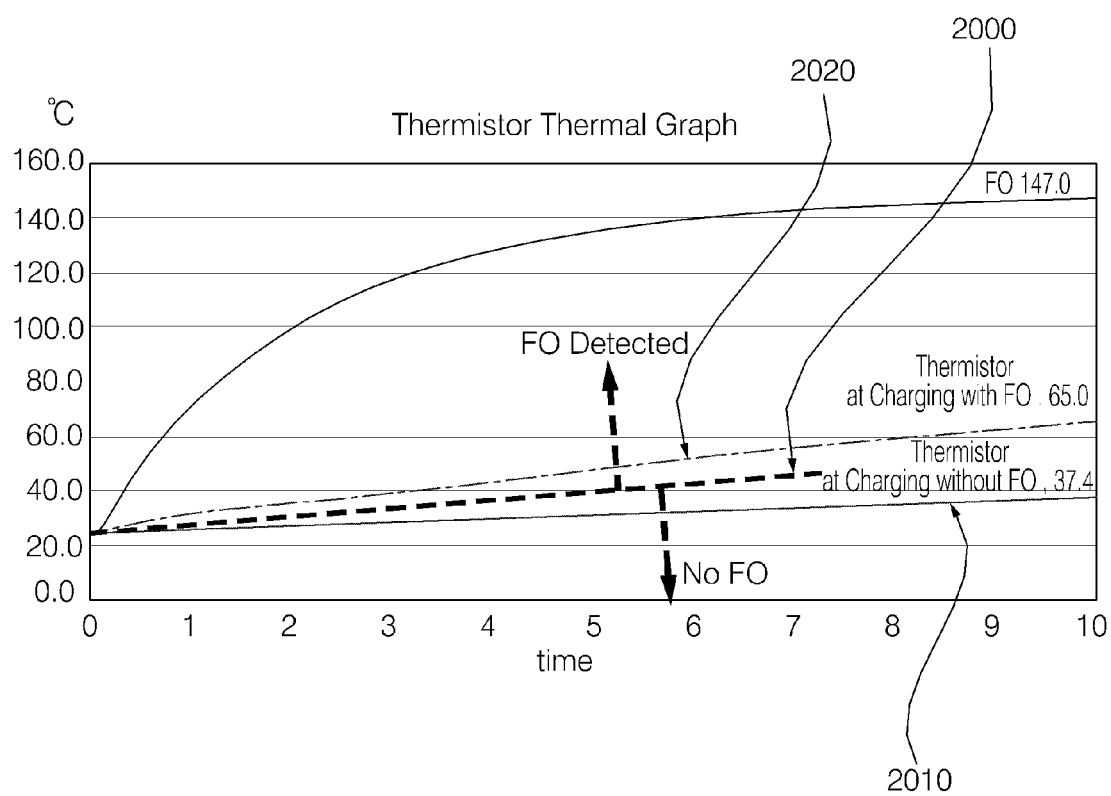
FIG. 20 is a diagram illustrating detection of a foreign object based on temperature information according to an embodiment of the present invention.

FIG. 20 is a diagram illustrating an operation of detecting a foreign object based on temperature information according to an embodiment of the present invention.

Referring to FIG. 20, according to an embodiment, the wireless charger 100 may further include a temperature sensing unit. The temperature sensing unit may further include one or more temperature sensors. A temperature sensor may be disposed in the surroundings of at least one of the coupling antenna 14, the coil part 15, and the driving part 17. The temperature sensor may sense temperature of heat that is generated by at least one of the coupling antenna 14, the coil part 15, and the driving part 17. The temperature sensor may be disposed in a portion where the tray 11 comes into contact with the mobile terminal 200. In this case, the temperature sensor may sense temperature of the mobile terminal 200.

The processor 170 may detect a foreign object FO based on sensing data acquired by the temperature sensing unit. In this case, the temperature sensor is preferably disposed in a portion where the tray 11 and the mobile terminal 200 are in contact with each other.

As illustrated in FIG. 20, if wireless charging is performed in the absence of any foreign object, a gradient indicated by reference numeral 2010 is obtained. If wireless charging is performed in the presence of a foreign object, a gradient indicated by reference numeral 2020 is obtained. The processor 170 may set a reference gradient 2000.

The processor 170 may determine whether or not a foreign object is present based on gradient data which indicates a degree of increase in temperature over time where the gradient data is acquired by the temperature sensing unit. Specifically, if a sensing data-based gradient is greater than the reference gradient 2000, the processor 170 may determine that a foreign object is present. In addition, if a sensing data-based gradient is smaller than the reference gradient 2000, the processor 170 may determine that a foreign object is not present. The processor 170 may then control the wireless charger as described above based on the detection or absence of the foreign object FO.

The present invention as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the embodiments set forth herein in all terms, but should be considered by way of example. The scope of the present invention should be determined by the reasonable interpretation of the accompanying claims and all changes in the equivalent range of the present invention are intended to be included in the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A wireless charger for a mobile terminal in a vehicle, comprising:
    a power transmitter including a plurality of transmitter coils and configured to wirelessly transmit power to a first mobile terminal;
    a memory configured to store frequency response characteristic data for a plurality of mobile terminal models and store frequency characteristic data for the plurality of transmitter coils;
    a temperature sensing unit configured to sense temperature of the first mobile terminal; and
    a processor configured to:
        acquire model information of the first mobile terminal based on detected frequency response characteristic data of the first mobile terminal;
        control the power transmitter to adjust parameters of the power transmitted to the first mobile terminal based on the model information of the first mobile terminal;
        acquire detected frequency characteristic data of power transmitted from each transmitter coil of the plurality of transmitter coils;
        based on the model information of the first mobile terminal, receive stored frequency response characteristic data of the first mobile terminal stored in the memory from the stored frequency response characteristic data for the plurality of mobile terminal models;
        detect a foreign object by both (1) comparing the stored frequency response characteristic data of the first mobile terminal for the plurality of mobile terminal models and the detected frequency characteristic data of the power transmitted from said each transmitter coil of the plurality of transmitter coils, and (2) based on gradient data which indicates a degree of increase in temperature over time where the gradient data is acquired by the temperature sensing unit;
        based on the detected frequency characteristic data of power acquired from each of the transmitter coils of the plurality of transmitter coils, determine a transmitter coil from among the plurality of transmitter coils via which power is to be wirelessly transmitted to the first mobile terminal,
    wherein the stored frequency characteristic data comprises a lookup table of spatial frequency characteristic data for the plurality of mobile terminal models based on location information relative to the wireless charger.

2. The wireless charger according to claim 1, wherein the processor is configured to detect the foreign object by comparing a first gradient corresponding to a first section of the stored frequency response characteristic data of the first mobile terminal in a predetermined range and a second gradient corresponding to a first section of the stored frequency characteristic data of the power transmitted from the power transmitter in the predetermined range.

3. The wireless charger according to claim 1, wherein the processor is configured to detect the foreign object located in an area corresponding to one of the transmitter coils of the plurality of transmitter coils by comparing the stored frequency response characteristic data for the plurality of mobile terminal models and the detected frequency characteristic data of the power acquired from said each of the transmitter coils of the plurality of transmitter coils.

4. The wireless charger according to claim 1, wherein the stored frequency response characteristic data comprises a second lookup table of frequency response characteristic data for the plurality of mobile terminal models based on power values.

5. The wireless charger according to claim 4, wherein the processor is configured to:
    acquire the model information by comparing the stored frequency response characteristic data for the plurality of mobile terminal models and the detected frequency characteristic data from said each transmitter coil of the plurality of transmitter coils.

6. The wireless charger according to claim 1, wherein the processor is configured to, when it is determined that the foreign object is detected, control the power transmitter so that power is not transmitted to the first mobile terminal.

7. The wireless charger according to claim 6, further comprising an interface configured to exchange a signal with a user interface apparatus for the vehicle, wherein the processor is configured to, when it is determined that the foreign object is detected, provide information on detection of the foreign object to the user interface apparatus.

8. A wireless charger for a mobile terminal in a vehicle, comprising:
 a power transmitter including a plurality of transmitter coils and configured to wirelessly transmit power to a first mobile terminal;
 a plurality of indicators disposed to correspond to the plurality of transmitter coils, respectively;
 a memory configured to store frequency response characteristic data for a plurality of mobile terminal models and store frequency characteristic date for the plurality of transmitter coils;
 a temperature sensing unit configured to sense temperature of the first mobile terminal; and
 a processor configured to:
  acquire model information of the first mobile terminal based on detected frequency response characteristic data of the first mobile terminal;
  control the power transmitter to adjust parameters of the power transmitted to the first mobile terminal based on the model information of the first mobile terminal;
  acquire detected frequency characteristic data of power transmitted from each transmitter coil of the plurality of transmitter coils;
  based on the model information of the first mobile terminal, receive stored frequency response characteristic data of the first mobile terminal stored in the memory from the stored frequency response characteristic data for the plurality of mobile terminal models;
  detect a foreign object located in an area corresponding to one of the transmitter coils of the plurality of transmitter coils, by comparing both (1) the stored frequency response characteristic data of the first mobile terminal for the plurality of mobile terminal models and the detected frequency characteristic data of the power transmitted from said each transmitter coil of the plurality of transmitter coils, and (2) based on gradient data which indicates a degree of increase in temperature over time where the gradient data is acquired by the temperature sensing unit; and
  control operation of at least one of the indicators based on information about whether the foreign object is detected and information about the area from which the foreign object is detected,
 wherein the stored frequency characteristic data comprises a lookup table of spatial frequency characteristic data for the plurality of mobile terminal models based on location information relative to the wireless charger.

9. The wireless charger according to claim 1, wherein the plurality of transmitter coils of the power transmitter comprises a first transmitter coil and a second transmitter coil, and wherein the processor is configured to:
 acquire model information of a second mobile terminal;
 wirelessly transmit power, which the parameters are adjusted based on the model information of the first mobile terminal, to the first mobile terminal via the first transmitter coil; and
 wirelessly transmit power, which second parameters are adjusted based on the model information of the second mobile terminal, to the second mobile terminal via the second transmitter coil.

10. The wireless charger according to claim 8, wherein the plurality of transmitter coils of the power transmitter comprises a first transmitter coil and a second transmitter coil, and wherein the processor is configured to:
 acquire model information of a second mobile terminal;
 wirelessly transmit power, which the parameters are adjusted based on the model information of the first mobile terminal, to the first mobile terminal via the first transmitter coil; and
 wirelessly transmit power, which second parameters are adjusted based on the model information of the second mobile terminal, to the second mobile terminal via the second transmitter coil.

* * * * *